Jan. 6, 1948. L. J. BOWNE 2,433,836
TELEPHONE CALL TRANSMITTER
Filed April 4, 1945 8 Sheets-Sheet 1

INVENTOR
L. J. BOWNE
BY: A. F. Kane
ATTORNEY

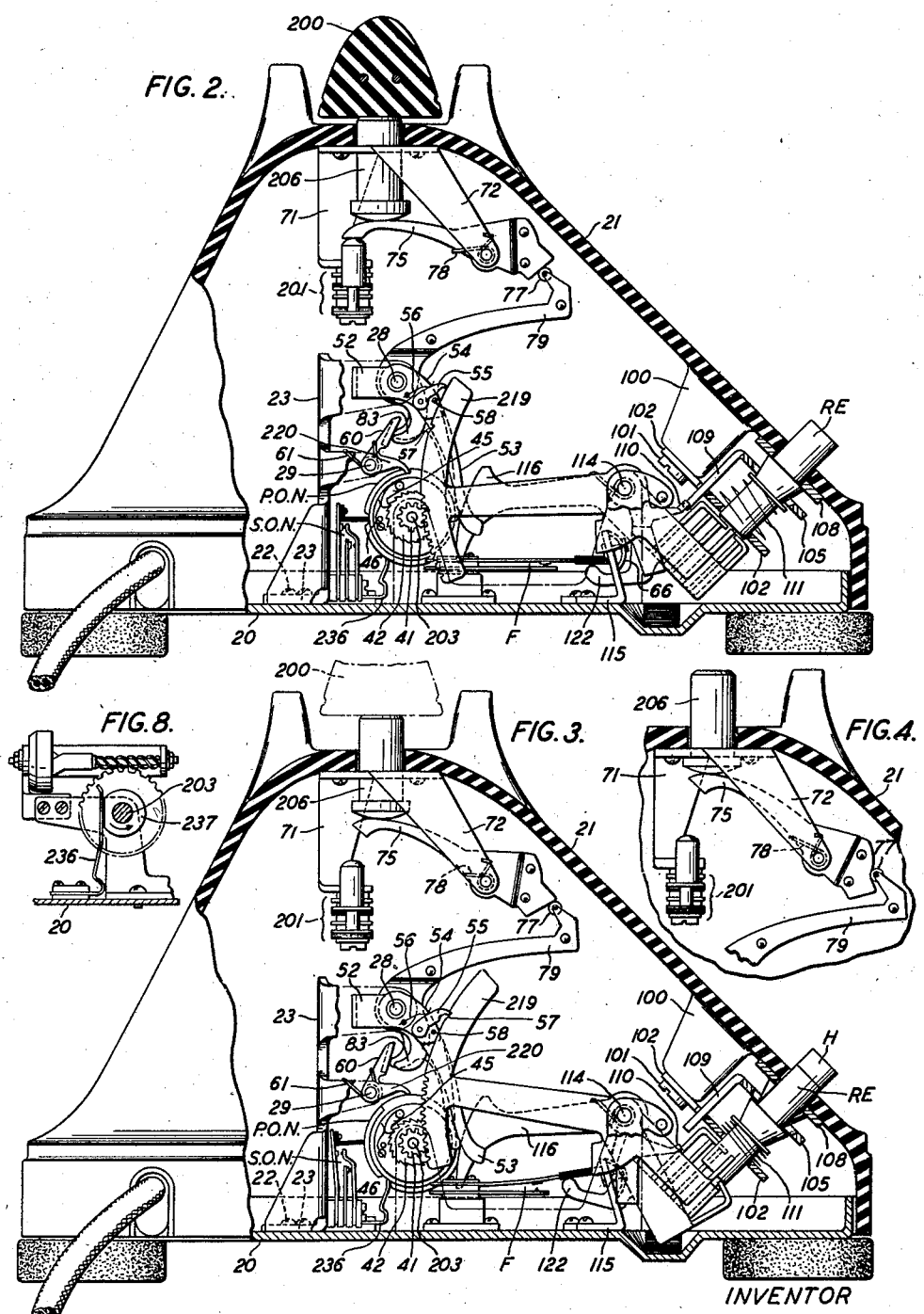

Jan. 6, 1948.          L. J. BOWNE            2,433,836
TELEPHONE CALL TRANSMITTER
Filed April 4, 1945           8 Sheets-Sheet 3

INVENTOR
L. J. BOWNE
BY: A. F. Kane
ATTORNEY

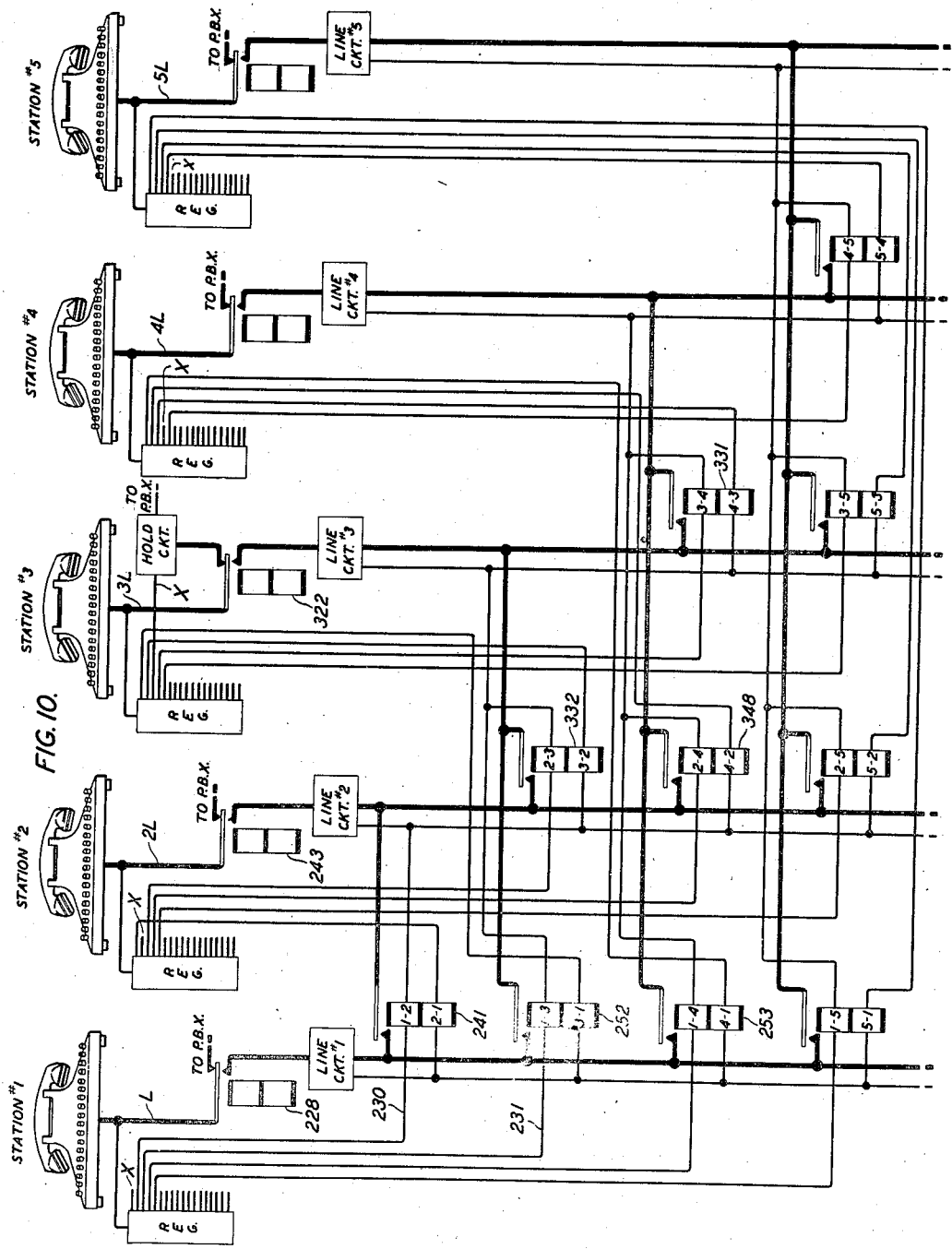

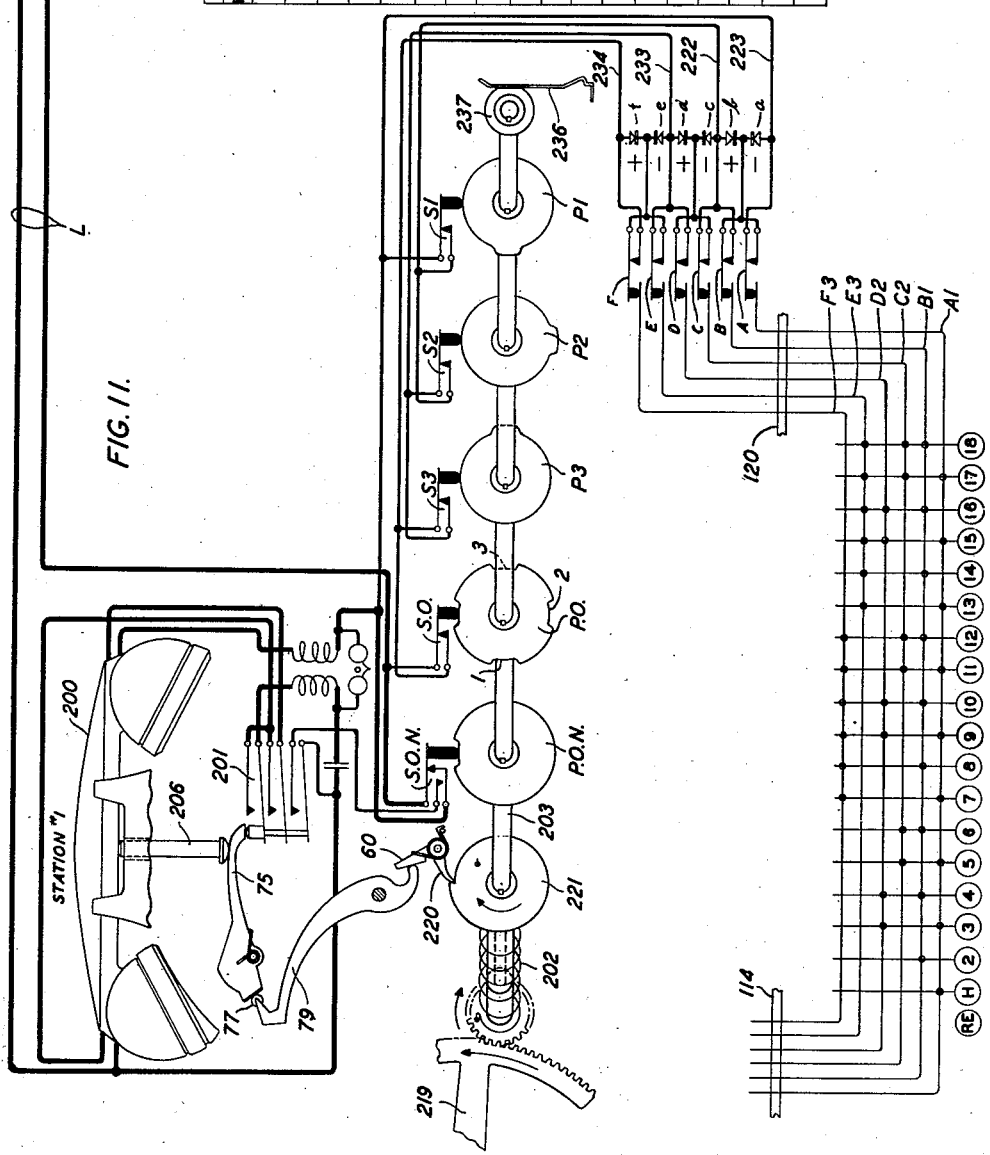

INVENTOR
L. J. BOWNE
BY:
ATTORNEY

Jan. 6, 1948.    L. J. BOWNE    2,433,836
TELEPHONE CALL TRANSMITTER
Filed April 4, 1945    8 Sheets-Sheet 8
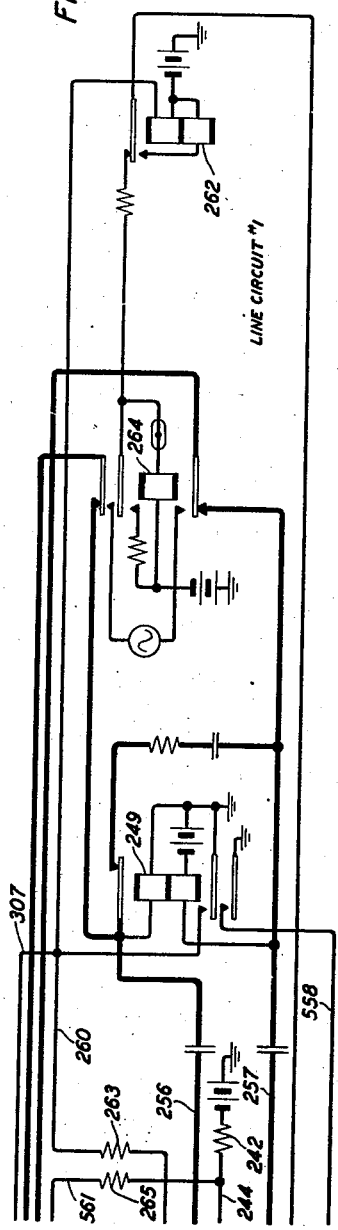
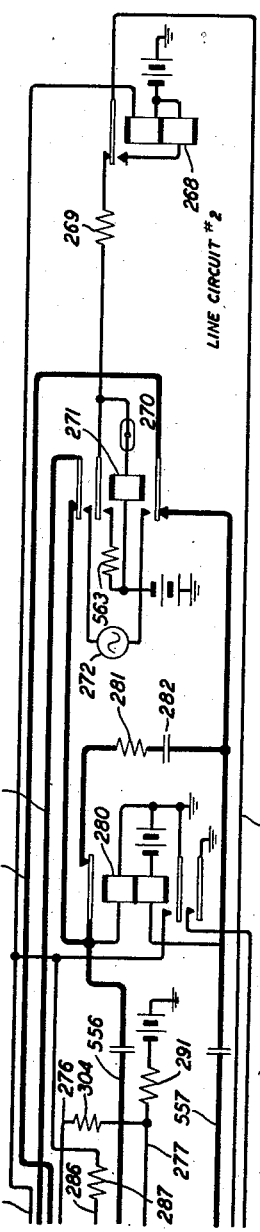
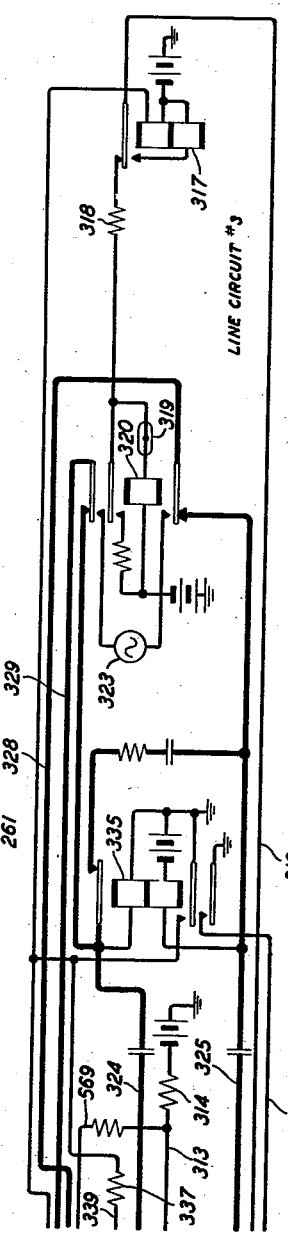
FIG. 14.
FIG. 15.
| FIG. 11. | FIG. 12. | FIG. 13. | FIG. 14. |
INVENTOR
L. J. BOWNE
BY:
ATTORNEY Patented Jan. 6, 1948

2,433,836

UNITED STATES PATENT OFFICE 2,433,836

TELEPHONE CALL TRANSMITTER

Langford J. Bowne, Howard Beach, N. Y., assignor to Bell Telephone Laboratories, Incorporated, New York, N. Y., a corporation of New York Application April 4, 1945, Serial No. 586,560

9 Claims. (Cl. 179—90)

This invention relates to telephone systems and particularly to central office, or private branch exchange telephone systems of the type in which subscribers' stations, having normal access to the exchange equipment in the extension of calls originated at the stations, are provided with additional facilities whereby direct communication connections between the several stations of the system may be initiated expeditiously and with a minimum of effort on the part of the subscribers thereat, and may be completed without routing the calls through the central office, or private branch exchange.

Systems of communication of the above-indicated character are generally known as key calling telephone systems in that connections between calling and called stations of the system may be initiated at any of the stations by simply actuating a key, or button, at the calling station assigned to the desired called station.

It is the object of this invention to provide an improved telephone system of the key calling type.

This object is attained in accordance with a particular feature of the invention by characterizing each of a plurality of station-identifying code signals by a different combination of three current impulses of positive, and/or negative polarities, and by the provision of preset means at the subscribers' station for predetermining the character of each of the three code impulses, and of means which function, incident to the removal of the telephone from its support at the calling station, to consecutively transmit the precharacterized impulses over the calling line to control the completion of a connection from the calling station to the called station identified by the consecutively transmitted code impulses.

More particularly, this feature of the invention contemplates a code signal transmitter of the dry rectifier type, and means embodied therein and selectively controlled by any of a plurality of manually operable station-identifying keys, or buttons, for preparing the transmitter for the transmission of a preselected code corresponding to the operated key, and other means for rendering the transmitter operable, to transmit the preselected code, in response to the removal of the telephone from its support subsequent to the actuation of the code selecting key, or button.

Another feature of the invention contemplates facilities whereby a false or incorrect setting of the code transmitter may be corrected prior to the removal of the telephone handset from its support at a call-originating station.

A further feature of the invention provides facilities whereby conference connections may be originated at any of the stations of the system, or additional stations may be added to an already existing connection between two stations without the necessity for the originating, or adding subscriber to restore the telephone to its support. More particularly, during the existence of a connection between any two subscribers' stations, either subscriber may actuate a key, or button corresponding to a third station to prepare the transmitter at the station for the transmission of the code signal which identifies the third station, and then operate key means which simulates the removal of the telephone at the station in causing the transmitter to operate and transmit the code of the third station.

A still further feature of the invention resides in the provision of means whereby a connection extending from any station and involving a central office or private branch exchange line may be held by transmitting from the station a predetermined code signal. More particularly, a hold key is provided at each of the stations and functions to transmit a predetermined group of code impulses which selectively control the connection of a holding bridge to the central office, or private branch exchange line.

Still another feature of the invention provides facilities whereby a subscriber may hold a connection on a central office, or private branch exchange line, and thereafter selectively complete a communication connection between his station and any other station of the system, and may also be a party to a conference connection for the period during which the central office, or private branch exchange connection is held.

Another feature of the invention precludes the possibility of losing a central office, or private branch connection in the event of accidental operation of the switchhook contacts after a call to the central office or private branch exchange has been initiated.

Other features of the invention contemplate novel circuit arrangements which render possible the realization of the features individually set forth above. In accordance with one such other feature, a pyramidal arrangement of selectively operable line-connecting relays is resorted to, the relays of which function under control of the code transmitters at the several stations of the system to selectively interconnect the line circuit of any calling station and the line circuit of any of a plurality of called stations. More particularly, each of the relays of the pyramidal arrangement of line-connecting relays comprises two separately energizable windings, each of which is selectively controllable from one of two different stations to extend a calling line to a called line. Each double winding line-connecting relay is assigned to two stations and is controlled therefrom in such a manner that when a first station originates a call to a second station the relay operates over one winding incident to the operation, at the first station, of a key, or button, allocated to the second station, and when the second station originates a call to the first station the relay operates over its other winding incident to the operation, at the second station, of a key, or button, assigned to the first station, and when operated over either winding, functions to interconnect the line circuits of both stations. Thus, the number of line-connecting relays for a system involving a predetermined number of stations is determined by the formula $$\frac{n^2-n}{2}$$

where $n$ is the predetermined number of stations. For example, in a system involving eighteen stations, the number of line-connecting relays required is one hundred fifty-three.

A still further feature of the invention contemplates the signaling of a called station substantially instantaneously with the seizure of the called line and to thereafter continue signaling the called station on an intermittent basis. This feature is obtained by means of a ringing control circuit comprising a single relay, a resistance and a thermistor, and a local source of alternating current, the elements of the ringing control circuit being so disposed relative to one another that, upon the operation of the relay to connect the alternating current source to the called line, the resistance is connected in parallel with the thermistor and the relay winding to reduce the current flowing through the thermistor. The thermistor accordingly cools off so as to prevent sufficient current to traverse the relay winding. The relay then releases and opens the resistance shunt thereby permitting sufficient current to again traverse the relay winding through the thermistor to cause the relay to operate. This cycle of operation and release of the ringing relay is repeated and the alternating current source is intermittently connected to the called line in a manner that simulates machine ringing and precludes the delay in the operation of the ringer at the called station which occurs when the ringing relay operates on the silent interval.

These and other features of the invention will be best understood from the following detailed description when read in connection with the accompanying drawings, in which:

Fig. 2 is an end view of the telephone set shown in Fig. 1 with a portion of the side wall of the casing broken away to expose the transmitter mechanism housed within the casing. In this view the mechanism is depicted in its normal condition and with the telephone handset on its cradle support;

Fig. 3 is a view similar to that of Fig. 2 showing one of the buttons depressed and the handset partially lifted from its support;

Fig. 4 is a fragmentary view of the transmitter control mechanism which is operated incident to the removal of the handset from its support. In this view the handset has been completely removed from its support;

Fig. 8 is a detail view illustrating the means employed for maintaining the code transmitter cam shaft in its normal position and for insuring the shaft coming to rest in that position after its cycle of operation;

Fig. 9 is a chart showing the various codes resulting from the operation of the buttons, and the bar contacts whose operation determines the code;

Fig. 10 is a wiring diagram illustrating in simplified schematic form the line-connecting and control circuits involved in the key-telephone system of this invention;

Figure 1:
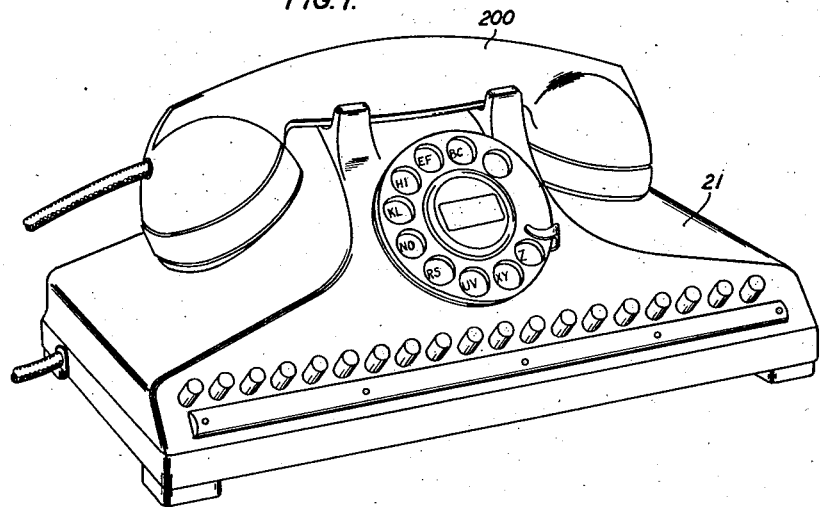
Fig. 1 is a perspective view of a telephone set illustrating the location of the various reset, hold and station-selecting buttons thereon. If desirable, the reset and hold buttons may occupy positions other than those illustrated, for example, the reset button may be located on one side of the set and the hold button to the right or left of the dial.

Figs. 11, 12, 13 and 14, when assembled in the manner indicated in Fig. 15 constitute a detailed disclosure of the circuits involved in the key-telephone system of this invention; and Fig. 15 is a block diagram showing the manner in which Figs. 11, 12, 13 and 14 are to be assembled to effect a complete showing of the circuits involved in the system of this invention.

Before entering into a detailed description of the code transmitter utilized at the several stations of the telephone system of this invention illustrated in the drawings and of the operation of the system, a brief reference will be made to Figs. 11 and 10 of the drawings. Fig. 11 includes a schematic illustration of the code transmitting mechanism while Fig. 10 is a schematic wiring diagram showing in simplified form an over-all picture of the system.

The essential elements of the code transmitter are schematically shown in Fig. 11. It consists of a rotatable cam shaft 203 having fixed thereto, in spaced relation, three pulsing cams P1, P2 and P3; a "pulse on" cam PO; an "off normal" cam PON; a single-toothed ratchet wheel or disc 221; and a cam 237 having a portion of its periphery flattened to cooperate with a flat spring 236. The cam 237 and its associated spring 236 function to assure the cam shaft coming to rest in its normal position after operation, and to hold it in this position. The left end of cam shaft 203 is hollow so as to accommodate a projection of the gear wheel meshing with a geared sector 219. A motor spring 202 has one end fixed to the gear wheel and the other end fixed to the ratchet wheel 221. The cam shaft 203 is normally held against rotation by the pawl 220 which engages the single tooth of the disc 221.

When the geared sector 219 is actuated in a manner to be subsequently described, energy is stored in the motor spring 202, and when the handset 200 is removed from its mounting, the linkage shown between the handset button 206 and the pawl 220 functions to disengage the pawl from the disc 221 whereupon the cam shaft 203 makes a complete revolution under the action of the motor spring 202.

The "off normal" cam PON is provided with a single notch which accommodates the stud controlling the contact springs SON when the cam shaft is in its home position. The cam PO is provided with four notches, 1, 2, 3 and the home position notch, spaced 90 degrees apart on the cam periphery. Each of the cams P1, P2 and P3 is provided with a single cam lobe, the three lobes being respectively displaced 90 degrees so that they function in sequence to operate their respective pulsing springs S1, S2 and S3. The springs S1 normally maintain a group of two dry rectifiers $a$ and $b$ short-circuited on the transmitter side; the springs S2 normally maintain a second group of two dry rectifiers $c$ and $d$ short-circuited on the transmitter side; and the springs S3 normally maintain a third group of dry rectifiers $e$ and $f$ short-circuited on the transmitter side. The two rectifiers of each group are oppositely poled.

Each of the dry rectifiers $a$, $b$, $c$, $d$, $e$ and $f$ is normally, individually short-circuited on the key selector side by corresponding springs A, B, C, D, E and F, which are individually controlled by the code bars A1, B1, C2, D2, E3 and F3, respectively, which code bars, in turn, are operated in various combinations under control of the keys, or buttons, designated H and 2 to 18, inclusive. The combination in which the code bars are operated in response to the actuation of any of the keys, or buttons, is indicated by the small circles appearing at the points at which the code bars cross the lines extending from the keys. For example, when key, or button, 9 is actuated, code bars A1, D2 and F3 are actuated, in turn operating springs A, D and F. Thus, when any one key or button, other than the reset button RE is actuated, one or more of the dry rectifiers has its individual short circuit removed by the operation of the corresponding springs A, B, C, etc.

As the cam shaft 203 starts its clockwise rotation under the action of motor spring 202, the springs SON immediately are operated to short the telephone equipment and to connect the tip conductor of the station line L to the ring conductor thereof through the springs S1, S2, S3 and SO, though the last set of springs, also operating at the start of rotation of the cam shaft, renders this connection open. When the cam shaft has rotated 90 degrees, the lobe of cam P1 functions to separate the springs S1 and simultaneously, the stud associated with the springs SO drops into notch 1 of cam PO. At this interval, therefore, the circuit from the tip conductor of the line L extends through the alternate contacts of springs 201 and SON, conductor 223, through rectifiers $a$ and $b$ if both springs A and B are actuated, or through both springs A and B if neither is actuated, conductor 222, springs S2, S3 and SO, to the ring conductor of line L. Thus, in the first signaling position of shaft 203, either one or the other, or both rectifiers $a$, $b$ are effectively included in the signaling circuit involving the conductors of line L and determine the character of the impulse transmitted thereover during this interval.

As the shaft 203 moves out of its first position, the stud associated with springs S1 functions to reclose the springs while the stud associated with springs SO moves out of the notch 1 in cam PO to open the springs SO. Thus the signal transmitting circuit is restored to its original condition, that is, with all dry rectifiers short-circuited on the transmitter side and the signal path open at the springs SO. In the second position of the cam shaft 203, the springs S2 are opened and the springs SO are closed so that the character of the signal impulse transmitted is determined by which, if any, or both of the rectifiers $c$ and $d$ have their short circuits removed by springs C and D. Similarly, for the third position of the cam shaft 203, the springs S3 function to remove the short circuit from the third group of rectifiers $e$ and $f$, so that, an impulse, depending for its character upon whether or not any of the two springs E and F is actuated, will be transmitted over the line L. The cam shaft comes to rest in its home position and the station circuit is reconnected to the line and the transmitter effectively disassociated therefrom.

The character of the code impulses consecutively transmitted by the transmitter incident to the actuation of the keys or buttons H, 2 to 18, inclusive, and the corresponding operated code bar contacts, are shown in the chart of Fig. 9.

Figure 7:
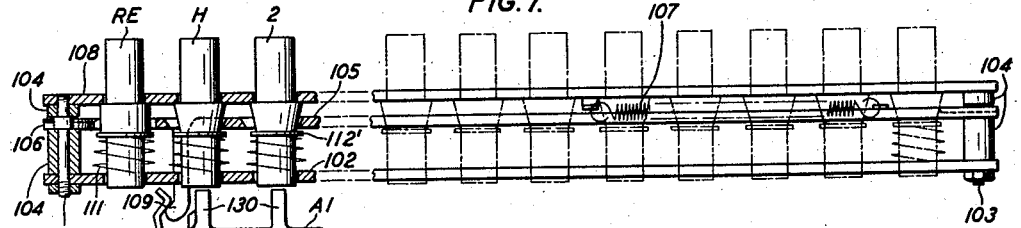
Figs. 7 and 7A are views illustrating the manner in which the buttons are mounted, and the latching and releasing mechanisms therefor.
Figure 7A:
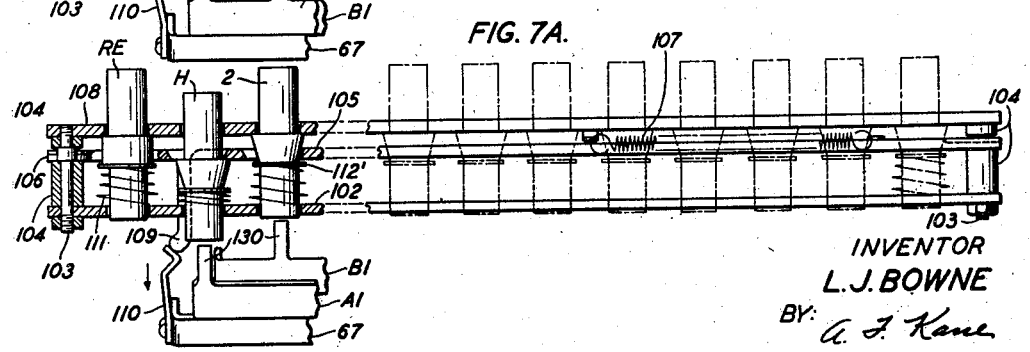
Figure 12:
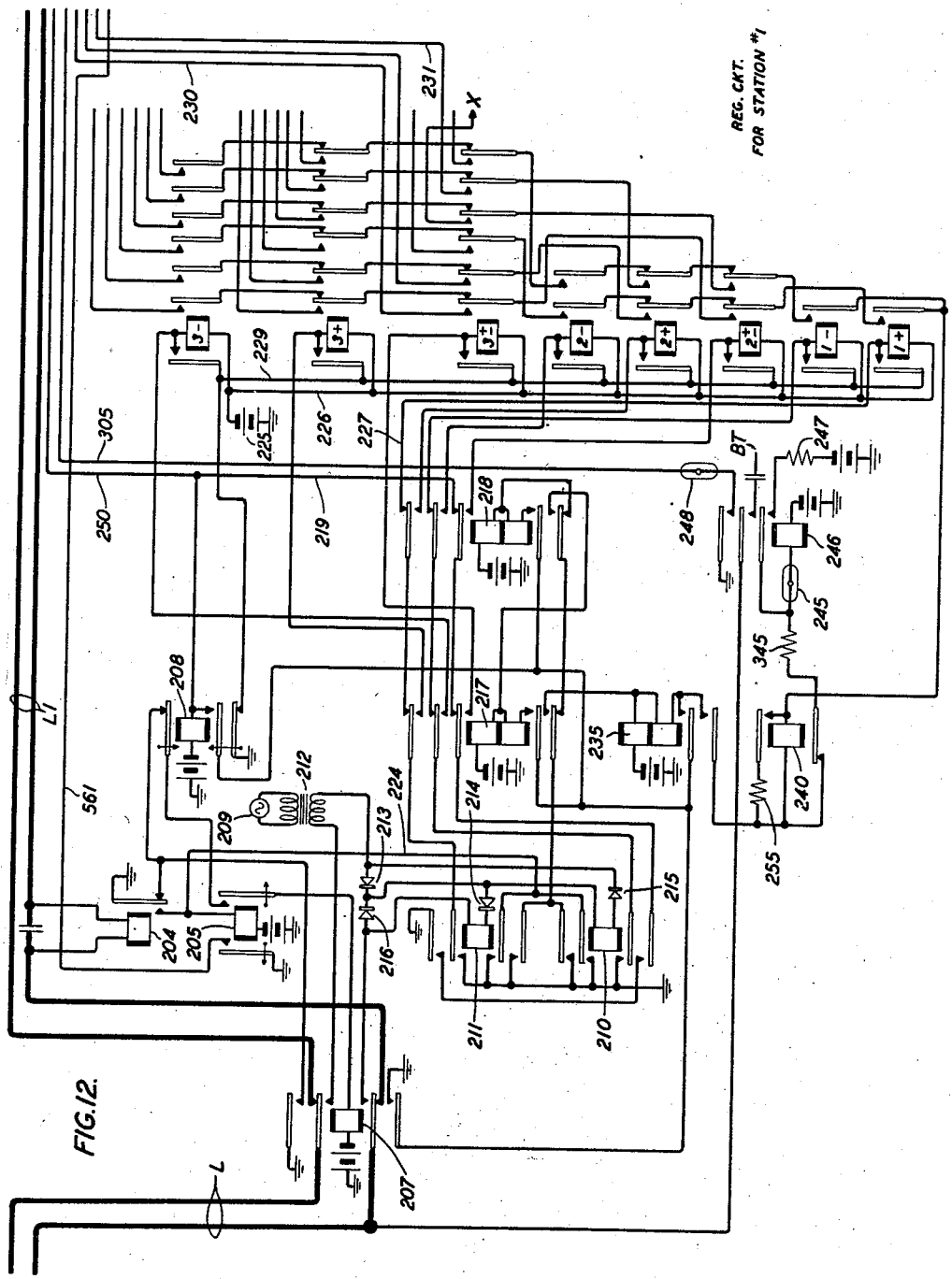
Figure 13:
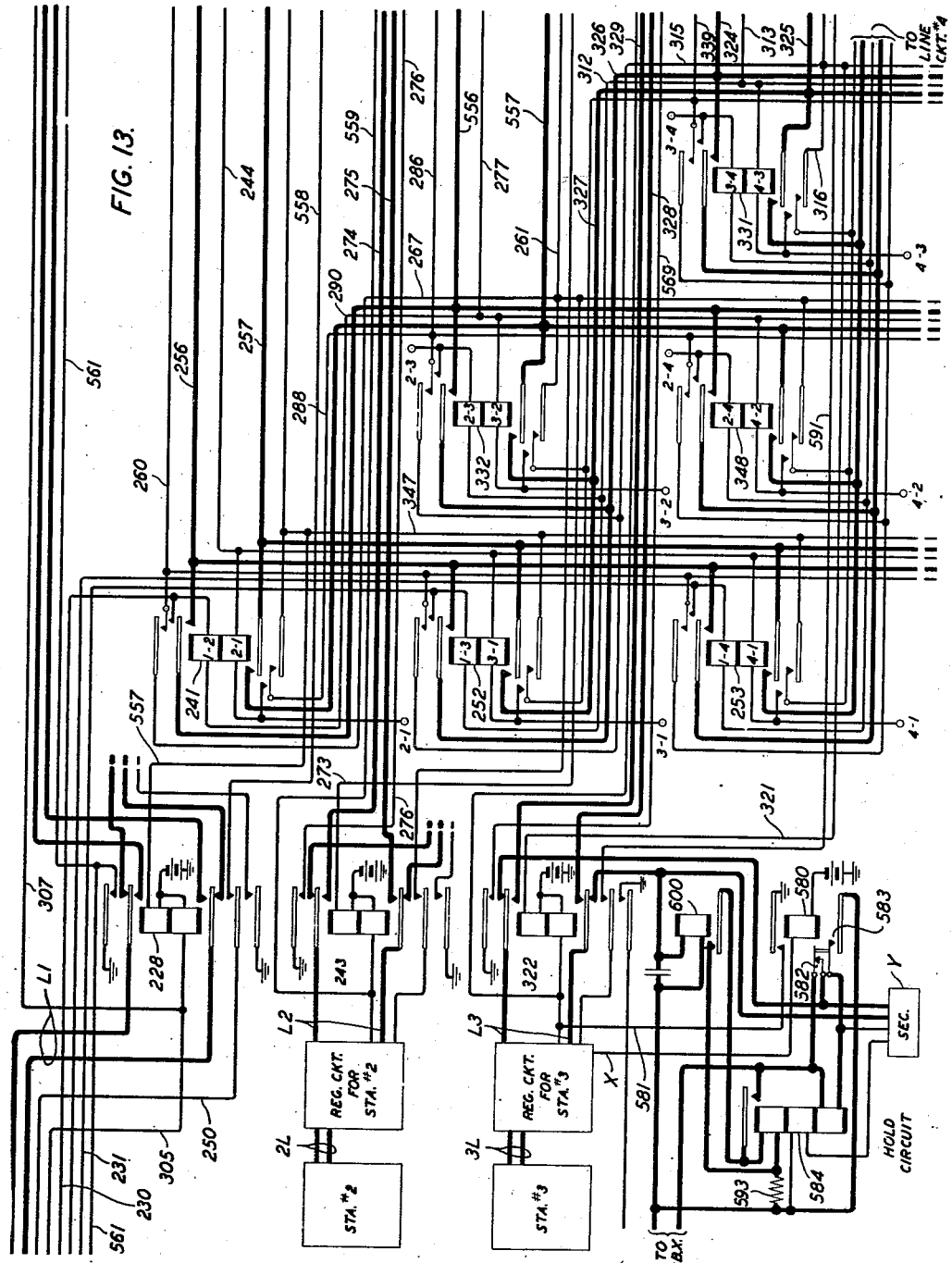

The key or button designated "RE" in Fig. 7 is a reset button and its function will be described in detail hereinafter.

Fig. 10 discloses five subscribers' stations each of which is equipped with a telephone handset on the base of which is mounted eighteen buttons or keys. In this showing only eighteen buttons are shown as a matter of convenience. The single heavy line conductors are intended to represent the tip and ring conductors, or the communication channels extending from each station and which are adapted for interconnection by the various double winding line-connecting relays shown. The rectangles designated "REG" are intended to represent the signal receiving and register circuits individually associated with each station.

Extending from each rectangle "REG" are eighteen conductors which, incident to the actuation of the buttons H and 2 to 18, inclusive, at any station are grounded to complete an energizing circuit for one or the other windings of the line-connecting relays, such as relays 241, 252, 253, 332, 348 and 331. Relay 241 is common to both stations Nos. 1 and 2, its upper 1–2 winding being controlled by button No. 2 at station No. 1 and finds battery in the line circuit No. 2, so that when energized by way of its upper winding, relay 241 functions to interconnect line circuits Nos. 1 and 2, with station No. 1 being the calling station and station No. 2 being the called station. Similarly, the lower 2–1 winding of relay 241 is controlled by button No. 1 at station No. 2 and finds battery in the line circuit No. 1, so that when energized by way of its lower winding, relay 241 again functions to interconnect line circuits Nos. 1 and 2, with station No. 2 being the calling station and station No. 1 being the called station.

Each of the other double wound pyramidal line-connecting relays is similarly common to two stations, relay 252 being common to stations Nos. 1 and 3; relay 253 to stations Nos. 1 and 4; relay 332 to stations Nos. 2 and 3; relay 348 to stations Nos. 2 and 4; relay 331 to stations 3 and 4, etc. As will appear from a later description, the operation of any line-connecting relay will be followed by the operation of corresponding cut-through relays such as relays 228, 243, 322, etc.

Extending from each register circuit "REG" is a conductor designated X. This conductor is grounded incident to the actuation of the hold button or key at each station, that is, the lead X from the register circuit "REG" associated with station No. 1 will be grounded when the hold button H at station No. 1 is actuated; the lead X from the register circuit "REG" associated with station No. 2 will be grounded when the hold button H at station No. 2 is actuated; etc. The grounding of any of these leads will serve to operate a relay in the hold circuit, such as relay 580 of Fig. 13 which functions to place a hold condition on the central office, or private branch exchange line, as will be fully described hereinafter.

Normally, the line extending from each station is extended to the central office, or private branch exchange line over back contacts of corresponding cut-through relays 228, 243, 322, etc. so that when the telephone handset at a station is removed from its support without a station-selecting button having been previously operated, the connection is made in the usual manner through the central office, or private branch exchange.

While but five stations are shown in Fig. 10, it is to be understood that the station capacity of the system is not so limited.

The description immediately following is directed to the mechanical structure of the code-transmitting mechanism, and for this purpose particular reference is made to Figs. 1, 2, 3, 4, 5, 6, 6A, 7, 7A and 8.

The base of the telephone set is identified by the numeral 20 and supports the cover or casing 21 in the well-known manner. Near the rear of the base 20 and secured thereto by means of screws 22 is a mounting bracket 23. This bracket is provided with a plurality of inwardly projecting arms 24, 25, 26 and 27 as clearly disclosed in Fig. 5. These arms constitute supports for two shafts 28 and 29, the latter being relatively short and supported in suitable apertures in the bracket arms 25 and 26. The shaft 28 which is considerably longer than shaft 29 is supported in suitable apertures in the bracket arms 24 and 27 and, as shown in Figs. 2 and 3, is located above and slightly forward of shaft 29. The elements which are carried by these shafts and their functions will appear as the description progresses. These shafts are prevented from longitudinal shifting by means of lock rings carried thereby externally of the supporting bracket arms.

Figure 5:
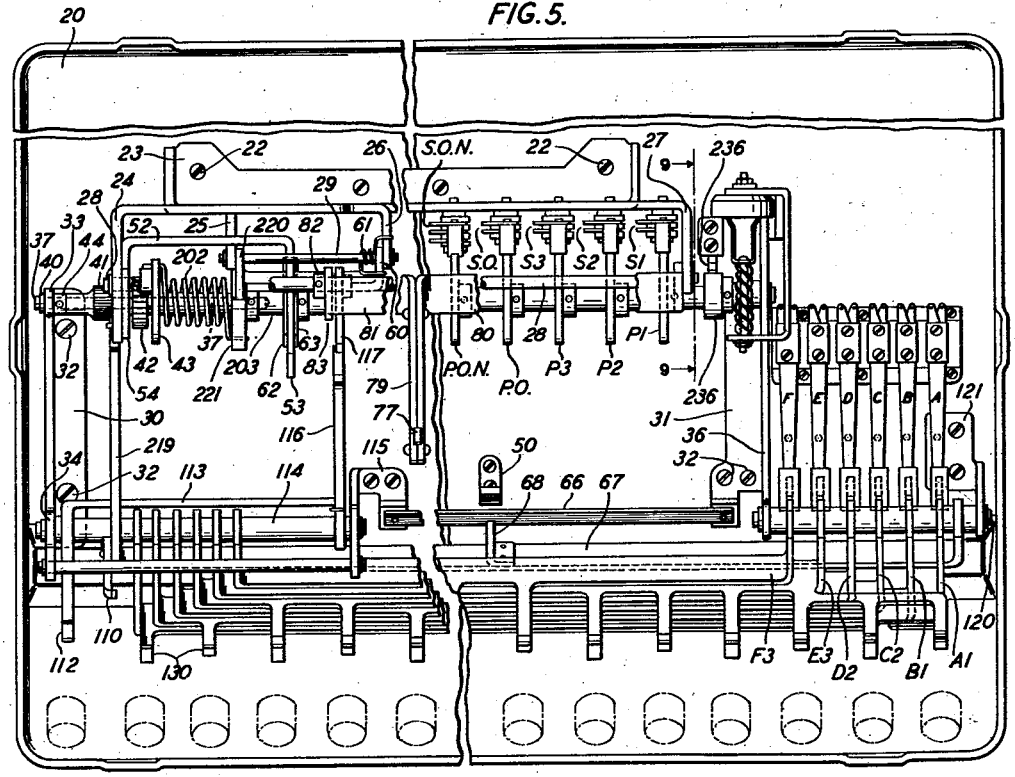
Fig. 5 is a plan view of the code transmitter mechanism.

A pair of brackets 30 and 31 which occupy positions at right angles to the longitudinal span of bracket 23 are fixed to the base 20 by means of screws 32 and is provided with two vertically-extending arms indicated by the numerals 33, 34, 35 and 36. Between the bracket arms 34 and 35 is mounted a two-piece shaft, the two portions of which are designated by the numerals 37 and 38, respectively. The shaft 38 is relatively long and at its inner, or left end viewing Fig. 5, is provided with a relatively short axial bore into which the right end of the shaft portion 37 is adapted to be journaled for rotational movement relative to the shaft portion 38. The shaft portions 37 and 38 are also provided with lock rings 40 and with fixed collars 44 to prevent longitudinal shifting thereof.

The shaft 37 supports a pinion gear 41, a ratchet wheel 42 and a disc 43 all of which elements are free to rotate on the shaft. The pinion 41 and the ratchet wheel 42 are integrally formed so that any rotational movement experienced by the pinion is similarly experienced by the ratchet wheel. The rotational movement of pinion 41 and ratchet 42 in one direction is communicated to the disc 43 through the pawl 45, which, as clearly shown in Figs. 2 and 3, is pivotally carried by the disc near a point at its edge and is biased in the direction of the ratchet wheel by means of the spring 46. Thus when the ratchet wheel 41 is driven in a counter-clockwise direction under control of a geared sector 219, as will be described more fully hereinafter, the disc 43 is similarly rotated.

The disc 43 is spring-coupled to the gear 221 by means of a motor spring 202, one end of which is fixed to the disc 43 and the other end of which is fixed to the gear 221. The gear 221 is provided with a collar or flange which is pinned to shaft 38 so as to fix the gear thereto. A tripping pawl 220 is carried on the shaft 29 and is held in engagement with the single tooth of the disc 221. The pawl 220 is an integral extension of a substantially U-shaped member 60, the two inwardly projecting arms of which are apertured to permit the passage of shaft 29 therethrough. A spring 61 whose ends bear respectively on the bracket arm 26 and the right arm of the pawl member 60 serves to normally bias the pawl 220 in a direction such as to insure engagement of the pawl with the gear 221.

In the normal position of the code-transmitting mechanism as shown in Fig. 2, the gear or disc 221 is held against counter-clockwise rotation by the influence of the pawl 220 so that when the sector 219 is actuated to drive the pinion 41, the disc 43 rotates, carrying with it one end of the motor spring 202, the other end of which is fixed to disc 221, and since the disc 221 is restrained from rotating by pawl 220, the motor spring 202 is wound up and stores sufficient energy to drive the shaft 38 when the pawl 220 is tripped in a manner to be described hereinafter.

The shaft 28, which hereinbefore has been described as being mounted in suitable apertures in the bracket arms 24 and 27, pivotally supports a substantially U-shaped member 52 having two depending arms 53 and 54, the former being considerably longer than the latter, as clearly appears in Figs. 2 and 3. On the outer face of arm 54 is pivotally mounted a spring-biased latching pawl 55 which serves as a latch to maintain the geared sector 219 in its operated position, as shown in Fig. 3. When the geared sector 219 is raised to its operated position, the free end of the latching pawl 55 is forced by the action of spring 56 into the notch 57 on the inner peripheral edge of the sector 219 and holds the sector in its operated position.

As will be described presently, the pawl member 60 with its integrally-formed pawl 220 is tripped to effect the release of the disc 221 under two conditions, one in response to the removal of the telephone handset 200 from its support, and the other in response to the operation of the reset button RE. Similarly, the pawl 55 which functions to lock the geared sector 219 in its operated position is actuated to release the sector at a predetermined time in the operation of the code transmitter. This release operation of the pawl 55 occurs near the end of the code-transmitting period and is effected by the engagement of a cam with the lower end of the arm 53 as will be described presently. Suffice it to say at this time that the lower end of arm 53 is forced forwardly by the cam so as to cause the member 52 to pivot in a counter-clockwise direction on the shaft 28. Thus the integral arm 54 thereof is moved upwardly carrying with it the pawl 55, it being understood that a stop pin 58 propels the pawl out of engagement with the notch 57 in the geared sector 219.

The shaft 38 has keyed thereto a series of cams identified as PON, PO, P3, P2, P1, 62 and 237. When the pawl 220 is tripped subsequent to the winding up of the motor spring 202, the energy stored in the spring is released and utilized to drive the shaft 38 through one revolution. It will be understood that when the pawl 220 is tripped, the geared sector 219 is still locked by the latching pawl 55 so that the pinion 41 and its integrally-formed ratchet wheel 42 and the disc 43 are held stationary so as to permit the energy stored in the motor spring 202 to be expended in driving the shaft 38 to which the above-identified cams are pinned. Mounted on the bracket 23 in cooperative association with the cams PON, PO, P3, P2 and P1 are the contact springs SON, SO, S3, S2 and S1, respectively. As described in connection with the schematic showing of the code transmitter in Fig. 7, and as will appear more fully in the circuit description to be made hereinafter, the cams function during their rotation to actuate their corresponding contact springs.

The cam 237 is provided on its peripheral edge with a flat section against which the flat spring 236 abuts as shown in Fig. 9. This cam-spring combination assures the shaft coming to rest in its normal position. The spring 236, as illustrated, is mounted on the base 20 of the telephone set.

The cam 62, which as shown in Fig. 5, is peripherally aligned with the arm 53 of the U-shaped member 52, is provided with a camming lobe 63 which is so positioned on the cam periphery that it functions during the last one-quarter revolution of the cam shaft to actuate the arm 53 and cause it to disengage the pawl 55 from the geared sector 219 so as to allow the latter to restore to its normal position under the action of spring 66 which is engaged by the bracket 68 mounted on the common bar 67 with which the geared sector 219 is integrally formed, when the common bar is actuated together with any of the code bars A1, B1, C2, D2, E3 and F3. At 50 is shown a stop mounted on the base of the telephone set which limits the extent to which the code bars and common bar 67 may be moved during operation.

On the underside of the cover 21 at its top and just below the cradle tines which support the telephone handset 200, is mounted a bracket rigidly fixed in position by means of screws and having two depending arms 71 and 72, the first of which carries the switchhook contact springs 201. The contact springs 201 are the usual switchhook springs which are operated to effectively include the station telephone apparatus in the line circuit when the handset is removed from its support. At its outer end the bracket arm 72 pivotally supports a lever 75 having one end interposed between the button 206 and the stud 77 associated with the contact springs 201. When the handset is positioned on its support, its weight serves to depress the button 206, which through the lever 75 and the stud 77 maintains the contact springs 201 in disengagement. When the handset is removed from its support, the lever 75, under the action of spring 78 and the tension of the contact springs 201, raises the button 206 and permits the contact springs 201 to move into engagement.

The outer end of lever 75 is provided with an irregular peripheral edge, one face of which normally engages a roller 77 which is rotatably mounted on the extreme end of the lever 79. The lever 79 is formed by riveting together two projections of complemental parts 80 and 81, which together form a substantially U-shaped element having two short arms at its extremities which are suitably apertured to receive the shaft 28. As shown in Fig. 5, the left end of this element, or of the complemental portion 81 thereof, is provided with a collar 82 which is pinned to the shaft 28. Also at its left end the portion 81 is provided with an integral hook-shaped projection 83 which normally abuts the tripping pawl member 60 with which the tripping pawl 220 is integrally formed.

Thus, when the telephone handset 200 is removed from its support, the lever 75 moves in a clockwise direction about its pivot causing lever 79 to move similarly about the shaft 28 so that the projection 83 of the lever acts upon the member 60 to cause the tripping pawl 220 to move out of engagement with the disc 221 thereby freeing the cam shaft 203 for rotation under the action of motor spring 202. Thus the shaft 203 is rotated, carrying with it the cams PON, PO, P3, P2, P1, 62 and 237, the second last of which, cam 62, functioning, as previously described, during the last quarter cycle of rotation to actuate lever arm 53 and to thereby cause the disengagement of the latch pawl 55 from the geared sector 219 to permit the sector 219 and its integrally-formed common bar 67 to restore to normal. It is to be understood that the motor spring 202 will be so adjusted that the energy stored thereby, when the spring is wound up, is sufficient to insure a complete revolution of the cam shaft 203. As the shaft reaches its home position, the energy in the motor spring will be sufficiently expended so that the engagement of spring 236 with the flat surface of cam 237 will insure the shaft coming to rest in its home position. The arresting of the shaft in this position is further insured by the dropping of the stud associated with the springs SON into the home position notch in cam PON. The pulsing cams P1, P2 and P3 will have functioned during the first three quarters of the shaft revolution to actuate the springs S1, S2 and S3 in sequence.

Fig. 3 illustrates the position of the levers 75 and 79 when the handset button is half-way projected from the casing 21. In this position the pawl 220 will have been tripped and the cam shaft 203 will have started its cycle of rotation.

When the handset 200 is completely lifted from its mounting, the relative positions of the levers 75 and 79 will be as illustrated in Fig. 4. The contour of the camming end of lever 75 is such that the lever 79 occupies the same positions with the telephone handset on its support and with the telephone handset fully removed. This is necessary since the code transmitter must function to transmit code signals in response to the removal of the handset from its support, and must also be capable of transmitting code signals with the handset already removed from its support in the event it is desirable to add other stations to an already-completed connection in the case of conference calls. Therefore, with the lever 79 in the position indicated in Fig. 4, the pawl 220 will be positioned so as to reengage the tooth in disc 221 at the end of the rotation of the cam shaft to thereby render the transmitter operable to transmit code signals while the handset is removed from its support.

In the event that a subscriber has actuated a station-selecting button improperly, that is, if button No. 2 is actuated when button No. 3, for example, should have been actuated to initiate a desired connection, provision is made to reset the transmitter before the handset is removed from its support and thereby render void the original setting of the transmitter. To provide for this contingency, all of the buttons mounted on the telephone set, with the exception of the reset button RE, are provided with means for latching them in their operated positions and other means, to be described presently, are provided for restoring the transmitter to its normal position.

As shown particularly in Figs. 2 and 3, a boss 100 depending from the underside of the casing 21 just above the position occupied by the buttons has secured to its lower face, by screws 101, a plate 102. This plate is provided with suitable apertures through which the lower shank portions of the buttons freely pass and constitutes one of three substantially similar plates which are mounted in superposed relation as a unit by means of screw bolts 103 and suitably-dimensioned spacing collars 104. The middle plate 105 is a latch plate provided at each end with a slot 106 which permits the plate to slide longitudinally a limited amount on the upper edges of the lower collars 104. A spring 107 having one end fixed to the uppermost stationary plate 108 and the other end fixed to the slidable plate 105 normally biases the latch plate to the left, viewing Figs. 7 and 7A. Each key or button, other than reset button RE, is provided with a camming area on its shank which serves, when any of these buttons is depressed, to move the plate 105 to the right against the action of spring 107 until the camming portion of the key shank has passed through its corresponding hole in the latch plate, when the spring 107 functions to restore the latch plate so that the upper edge or shoulder of the camming portion of the key impinges against the underside of the latch plate. In this manner any of the keys, other than reset key RE, is effectively locked in its depressed position when manually moved thereto.

Depending from the latch plate 105 near its left end is a cam projection 109 which is adapted to be engaged by the projection 110, fixed to the left end of the common bar 67, in such a manner that when the common bar is restored to normal, as will be described, the projection 110 in moving upwardly engages, with a camming action, the projection 109 causing the latch plate 105 to be moved to its unlatching position and thereby effecting the release of the depressed button. Each button is provided with a coil spring 111 which is wound around the lower shank portion of the button and is confined between a collar 112 and the upper face of the stationary plate 102. This spring together with the return of the operated code bars serves to restore the button when unlatched.

The reset button RE is of the non-locking type and is normally held in its unoperated position by the spring 111. When depressed, this key engages the extension 112 of a substantially Z-shaped member 113 which is pivotally mounted on the shaft 114. The shaft 114 is carried in suitable apertures in vertical extensions of bracket 30 and bracket 115, the latter of which is fixed to the base 20 by means of screws and cooperates with a forward extension of bracket 31 in furnishing a support for the spring 65, which spring, as previously mentioned, is engaged by the common bar 67 when the latter is actuated and serves to assist in restoring the common bar to normal. The inwardly projecting arm of the Z-shaped member 113, which is identified on the drawings by the numeral 116, has its inner end arcuately shaped so as to function as a cam in actuating the arm 117, which, in turn, is pivotally mounted on the shaft 28. A hook-like projection 118 extends from the underedge of the arm 117 and makes contact with the pawl member 60 which, as previously described, has integrally formed therewith the tripping pawl 220.

When the reset button RE is actuated subsequent to the depression and locking of a station-selecting button and prior to the lifting of the handset 200 from its support, the lower face of the button RE engages the projection 112 and depresses it. The inwardly-projecting cam arm 116 of the Z-shaped member 113 moves upwardly from the position shown in Fig. 6 to the position shown in Fig. 6A, and in so doing, cams the arm 117 in a counterclockwise direction. The hook-like projection 118 of arm 117 accordingly functions to lift the tripping pawl 220 out of engagement with the tooth of disc 221 thereby freeing the cam shaft 203 and permitting it to rotate under the action of motor spring 202. Since the telephone handset is not removed from its support at this time to operate switchhook springs 201, the operation of the code-sending springs by their respective cams does not result in the transmission of a code signal over the line. When the code-transmitting mechanism completes its cycle, the geared sector 219 of the common bar 67 is released in a manner previously described and under the action of spring 66 restores to normal position. As the bar 67 approaches normal position, the projection 110 thereon engages the latch plate arm 109 to move the latch plate 105 to its unlatching position whereupon the previously-operated and locked button restores to its normal position under the action of its corresponding spring 111.

The six code bars A1, B1, C2, D2, E3 and F3 and the common bar 67 are pivotally carried on shafts 114 and 120, the latter being supported in suitable apertures in an extension of bracket 31 and in the bracket 121. Suitable collars are interposed between the code bars and their supports to maintain them in fixed-spaced relation. Each of the inwardly-projecting right-hand extensions of the code bars is provided with an integral spring-operating projection 122 which serves to operate the springs A, B, C, D, E and F when the corresponding code bar is actuated. These springs, as previously described, operate to remove short circuits from the dry rectifiers $a, b, c, d, e$ and $f$.

Each code bar is provided with short, integral substantially vertical projections 130 which are disposed immediately below the buttons H, 2, 3 to 18 mounted on the telephone set. The number of projections 130 on each code bar is determined by the number of buttons which operate the code bars. As indicated in Fig. 7, code bar A1, for example, is provided with nine spaced projections so that this code bar is actuated when any one of buttons H, 3, 5, 7, 9, 11, 13, 15 and 17 are depressed. In cases where one button functions to actuate more than one code bar, the projections 130 extending from such code bars are provided with right angular offsets so as to render the plurality of bars operable by a single button, as shown in Figs. 2 and 3. The common bar 67 is so disposed relative to the six code bars that it is operated whenever any one of the code bars is depressed. In other words, the common bar 67 is actuated whenever any one of the buttons H, 2, 3 to 18 is operated.

The contact springs A, B, C, D, E and F are suitably mounted on the base of the telephone set as clearly shown in Fig. 5, and also in Figs. 2 and 3.

Operation of the code transmitter

When it is desirable for the subscriber at a calling station to initiate a call to another station, station No. 2 for example, the button 2 corresponding to the called station is depressed and then the handset 200 is removed from its support.

Button 2, as indicated in Fig. 7, functions to actuate a single code bar B1, so that the code bar B1 in the position of button 2 is provided with a projection 130 which is engaged by the underface of the button and forced inwardly. Code bar B1 is therefore depressed and causes the common bar 67 to experience a similar operation. As the common bar moves downwardly, it carries with it the projection 110 (Fig. 7A) and by virtue of the camming action of the button 2, the latching plate 105 is moved to the right. When the camming portion of the actuated button clears the corresponding hole in plate 105, the spring 107 functions to restore the latch plate 105 to its normal position, causing the depressed button to be locked thereby in its operated position. The projection 122 associated with code bar B1 moves upwardly to operate the springs B causing these springs to separate and thereby remove the short circuit from dry rectifier b. The geared sector 219 associated with the common bar 67 pivots on shaft 114 so that its geared end is raised. The pinion gear 41 which meshes with the geared sector 219 is therefore rotated in a counter-clockwise direction. The ratchet wheel 42 is similarly rotated and by virtue of the pawl 45 which couples the ratchet wheel 42 and the disc 43, the rotation of the ratchet wheel is communicated to the disc 43.

The motor spring 202 which couples the discs 43 and 221 is wound up due to the rotation of the disc 43, it being understood that the disc 221 which is pinned to shaft 203 is prevented from rotation at this time by the engagement of tripping pawl 220 with the tooth thereof. Thus, incident to the depression of button 2, energy is stored in motor spring 202, and rectifier contact springs F are operated to open position. When the button 2 reaches the limit of its stroke, the geared sector 219 will have been raised to such a position that the latch pawl 55 drops into notch 57 in the geared sector to maintain the geared sector in its operated position. Thus the geared sector 219 and the depressed button 2 are locked operated.

Removal of the handset 200 from its support permits springs 201 to operate. Through the linkage consisting of handset button 206 and the pivoted lever 75, the lever arm 79 is depressed causing it and its oppositely projecting arms 80 and 81 to pivot in a clockwise direction on shaft 28. The member 83 which is integrally formed on the left end, viewing Fig. 5, of arm 81 accordingly moves to cause the tripping member 60 to rotate against the action of spring 61 on shaft 29 in a counter-clockwise direction. Tripping pawl 220 which is integral with tripping member 60 is accordingly moved out of engagement with the tooth of disc 221 whereupon the energy stored in motor spring 202 is released and is expended in causing the rotation of shaft 203 with its plurality of cams P1, P2, P3, PO, PON, 237 and 62.

As cam 62 nears its home position, the lobe 63 thereof acts on the lower end of arm 53 causing it to move forwardly, viewing Figs. 2 and 3. The arm 53, as previously described, is the longer right-hand extension of the substantially U-shaped member 52 whose shorter left-hand arm is indicated by the numeral 54 in the drawings. Thus, due to the camming action of the lobe 63 of cam 62 on the arm 53, the arm 54 also is moved forwardly, or more accurately, in a counter-clockwise direction. The pin 58 fixed to the arm 54 therefore functions to lift the latching pawl 55 from the notch 57 in the geared sector 219 thereby releasing the geared sector, which, as previously stated, is integral with the common bar 67. The spring 66 then functions to restore the common bar to normal and also the actuated code bar B1.

As the common bar 67 returns to normal, the projection 110 carried thereby moves upwardly to engage, with a camming action, the projection 109 of the latch plate 105. The latch plate is thereupon moved to the right a distance sufficient to permit the depressed button to restore to normal under the action of its associated spring 111.

*Operation on conference basis*

When the handset 200 is completely removed from its support, the position of lever arm 79 relative to that of lever 75 is shown in Fig. 4. This position of lever arm 79 is the same as that occupied by the lever arm when the handset is on its mounting on the telephone set as shown in Fig. 2. Thus, subsequent to the removal of the handset from its mounting, the mechanism controlled by lever arm 79 is in its normal condition so that when the shaft 203 completes its cycle of rotation, the tripping pawl falls into the notch effected by the tooth on the periphery of disc 221, thereby reconditioning the transmitter for a subsequent operation while the handset is still removed from its support.

If, after actuating the button 2, and during the time the connection to the called station is completed, the calling subscriber desires to add another station, station No. 3 for example, to the connection, he may do so by merely actuating button 3 corresponding to station No. 3, and following it with the operation of the reset button RE. When button 3 is depressed, the motor spring 202 is again wound up, it being recalled that with the handset lifted from its support the lever arm 79 assumes its normal position, as shown in Fig. 4, so that the tripping pawl 220 re-engages the tooth in disc 221 to hold the disc against rotation during the actuation of the button and the consequent winding up of spring 202. As in the previous case, the geared sector is locked operated when button 3 is fully depressed.

Figure 6:
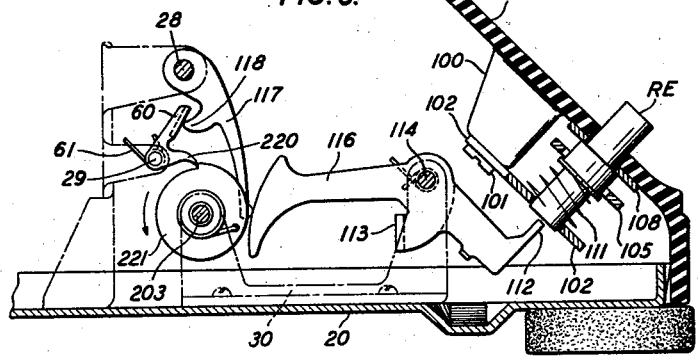
Fig. 6 is a view of the reset control mechanism prior to the operation of the reset button.
Figure 6A:
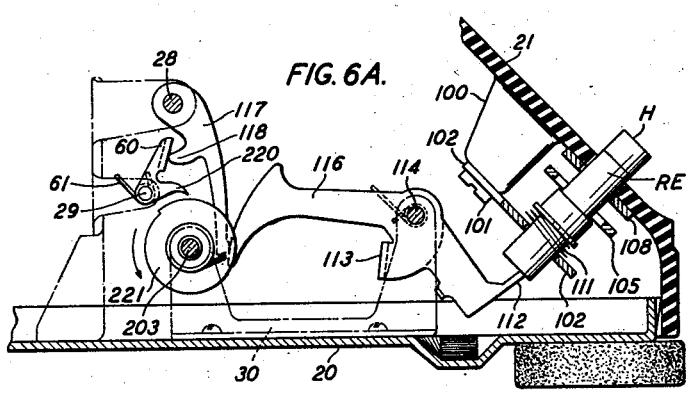
Fig. 6A is a view similar to that of Fig. 6 showing the reset control mechanism in its operated condition.

When reset button RE is then actuated, its lower face engages the projection 112 causing the camming lever 116 to move lever 117 inwardly as shown in Fig. 6A, whereupon the tripping pawl 220, through the engagement of the hook-like projection 118 of lever 117 and the tripping member 60, is lifted out of engagement with the tooth of disc 221 permitting the spring 202 to function to drive the cam shaft 203 through a complete revolution. The cams carried thereby function to transmit the code corresponding to station No. 3, the character of which is determined by the open condition of springs A and D which were actuated by code bars A1 and D2, respectively, when the button 3 was depressed.

The reset button RE also serves to permit a subscriber to correct an error resulting from the depression of a wrong station-selecting button before the handset is removed from its support. When a button has been depressed erroneously and the error is detected before the handset is removed from its support, the subscriber merely actuates the reset button RE which releases the code-transmitting mechanism causing it to perform a complete cycle of operation. Obviously, since the signaling circuit is open at the lowermost contacts of springs 201, no code impulses will be transmitted over the line when the handset is in its position on the telephone set. After the return to normal of the transmitter in the manner previously described, the correct station

Circuit operation: call to private branch exchange or central office

It will be observed that the line L extending from station No. 1 normally extends to a private branch exchange or central office by way of the two inner armatures and back contacts of relay 207, link LI and the inner upper and innermost lower armatures and back contacts of cut-through relay 228. Thus, to extend a call to the private branch exchange, or central office the party at station No. 1, for example, need only remove the telephone handset 290 from its support to effect the closure of the contact springs 201. These springs when operated to their closed positions complete the closure of the station loop in a well-known manner and cause the supervisory relay 204 to operate over the closed loop.

Relay 204 completes an obvious operating circuit for the slow-to-release relay 205. At its left armature and front contact, relay 205 connects ground potential to conductor 561 and thence over resistance 265 and conductor 244 to the right terminals of the lower windings of relays 241, 252 and 253 thereby marking all such relays through which access to station No. 1 is had, busy. This removal of the telephone set at station No. 1 causes the usual line relay to operate at the exchange to bring in a call signal thereat. The call is answered at the exchange in the usual manner. In the case of an automatic exchange dial tone would be connected to the calling line in the well-known manner.

Should the switchhook or handset button of the telephone set at station No. 1 be accidently, momentarily depressed at this time, no permanent loss of the exchange connection results and the calling line will be automatically reconnected to the exchange in the following manner. The opening of the contacts 201 incident to the accidental operation of the button 206 at station No. 1 opens the station loop causing supervisory relay 204 to be deenergized and to release its armature. Relay 205 being slow-to-release remains operated and during the interval in which relay 204 is deenergized, relay 207 operates in a circuit extending from grounded battery, through the winding of relay 207, armature and front contact of relay 205, upper armature and back contact of relay 208, to ground at the back contact and armature of relay 204. At its outer upper armature and front contact, relay 207 completes a locking circuit for itself independent of the armature and back contact of relay 204. At its inner upper and inner lower armatures and front contacts, relay 207 transfers the calling line L from the link LI extending to the private branch exchange, or central office to the conductors extending to the alternating current signaling source 209.

Relays 210 and 211 of the signal receiving and register circuit operate on alternate half cycles of current from the source 209. The operating circuit for relay 211 extends from the right terminal of the secondary winding of transformer 212, through the dry rectifiers 213 and 214, winding of relay 211, front contact and inner lower armature of relay 207, over the ring conductor of the calling line L, over the closed loop at the calling station to the tip conductor of line L, inner upper armature and front contact of relay 207, to the left terminal of the secondary winding of transformer 212. Relay 211 thus operates on the positive half cycles of current from the source 209. The operating circuit for relay 210 may be traced similarly except that rectifiers 215 and 216 are substituted for rectifiers 214 and 213, respectively, and the winding of relay 210 for the winding of relay 211. Thus relay 211 operates on the negative half cycles from the source 209.

Ground potential is now extended by way of the outer upper armature of relay 211 and the outer lower armature of relay 210 and their respective front contacts, to the innermost upper armatures and back contacts of relays 217 and 218, conductor 219, winding of relay 208, to battery and ground. Relay 208 operates in this circuit and at its upper armature and back contact opens the locking circuit for relay 207, which relay deenergizes and restores its armatures, reconnecting the calling line L to the link LI extending to the exchange. With the release of relay 207 and the consequent opening of the conductors to the signaling current source 209, relays 210 and 211 release and open the operating circuit to relay 208. Relay 208 released, the circuit is restored to the condition it was in prior to the momentary actuation of the switchhook contacts at station No. 1 and the connection between the calling station and the exchange is reestablished.

Replacement of the receiver, or handset at station No. 1 at the termination of the call to the exchange interrupts the station loop in the usual manner, causing the release of relay 204, which in turn, opens the circuit to relay 205. The circuit is then in its normal condition.

Keyed call to station No. 2

When a call is to be initiated at the station No. 1, for example, and intended for the party at station No. 2, for example, to which station the calling party has direct access, the station-selecting button, or key No. 2 allocated to the called station No. 2, is manually depressed and the telephone handset 200 removed from its support in that sequence. The depression of key No. 2 at station No. 1 causes the operation of code bar BI as well as the common bar with which the geared sector 219 is integrally formed as previously described. The actuated code and common bars are locked in their operated positions. The operation of the geared sector 219 causes the motor spring 202 to be wound up, in the manner described, while the transmitter shaft 203 is restrained from rotation due to the engagement of the pawl 220 with the cam 221 which is fixed to shaft 203. The handset when removed from its support trips the pawl 220 and closes the switchhook contacts 201. Upon operation of the pawl 220, the cam shaft 203 is caused to rotate receiving the energy stored in the motor spring 202. The shaft 203 makes one complete revolution.

As the cams PON and PO move out of normal positions, the alternate contacts of springs SON function to short-circuit the telephone set and the normal contacts serve to remove the short circuit from the code sending contacts SI, S2 and S3. The contacts SO open to maintain the signaling circuit open, it being understood, as will appear presently, that the path for the signal impulses include the contacts SO and requires the closure of these contacts for its completion.

Immediately upon the removal of the handset from its mounting the springs 201 are closed to complete the closure of the station loop circuit in the well-known manner. This loop, in this system includes the normally closed contacts SON. Relay 204 thereupon operates from battery at the exchange and completes an obvious operating circuit for relay 205. Relay 205, operated, marks relays 241, 252 and 253 and all other relays through which station No. 1 is reached, busy. As the cam shaft 203 starts to rotate, the contacts SON and SO are operated so that the telephone set is short-circuited by the alternate contacts SON and the loop circuit is now open at the contacts SO. During this open interval relay 204 releases and with relay 205 still operated due to its slow-to-release characteristics, relay 207 operates as previously described and locks to ground at its own outer upper armature and front contact by way of the armature and front contact of relay 205 and the upper armature and back contact of relay 208. Relay 207 performs the same functions ascribed to it hereinbefore, one of which is to connect the signaling current source 209 to the calling line L.

With code bar B1 operated in the station set, as described, the spring contacts B controlled thereby will be opened to remove the short circuit from rectifier $b$. These rectifiers, however, as well as all other rectifiers $a$, $c$, $d$, $e$, and $f$ will remain short-circuited until the cam springs S3, S2 and S1 are operated by their respective cams P3, P2 and P1. Thus, it will be noted, the code bars selectively prepare certain of the rectifiers $a$ to $f$, inclusive for effective use in transmitting correspondingly characterized impulses while the cams P1, P2, and P3 function sequentially to take the characterized impulses and apply them to the line L.

As the cam shaft 203 reaches its first position after one quarter of a revolution, the pulsing lobe of cam P1 will open the springs S1 and the stud associated with the springs SO will drop into the first notch 1 of cam P0. While this condition maintains, a circuit may be traced for the positive half cycles from source 209, from the right terminal of the secondary winding of transformer 212, rectifiers 213 and 214, winding of relay 211, front contact and inner lower armature of relay 207, ring conductor of line L, closed contacts SO, contacts S3 and S2 in series, conductor 222, rectifier $b$ from which the short circuit has been removed by the operation of code bar B1 and its associated contact B, normal closed contacts A, conductor 223, alternate contacts SON, tip conductor of line L, inner upper armature and front contact of relay 207, to the left terminal of the primary of transformer 212. It will be noted that no path exists at this time for the negative half cycles so that only relay 211 operates and relay 210 remains unoperated.

At its inner lower armature and front contact, relay 211 connects ground to conductor 224 to maintain relay 205 operated. At its inner upper armature and front contact, relay 211 completes a circuit for the energization of relay 1+ which extends from grounded battery 225, conductor 226, winding of relay 1+, conductor 227, back contacts and outermost upper armatures of relays 218 and 217, inner upper armature and front contact of relay 211, to ground. Relay 1+ operates in this circuit and locks to ground at the back contact and outer lower armature of relay 208, by way of its own left armature and front contact and conductor 229. At its outer lower armature and front contact, relay 211 establishes a circuit for the upper winding of relay 218 which may be traced from grounded battery, upper or primary winding of relay 218, back contacts and outer lower armatures of relays 218 and 217, to ground by way of the outer lower armature and front contact of relay 211. Relay 218 operates partially at this time and connects its lower or secondary winding in series with its primary winding to ground at the outer lower armature and front contact of relay 207. Relay 218 is prevented from full operation at this time as its secondary winding is short-circuited by the outer lower armature and front contact of relay 211. Thus, upon the transmission of the positive impulse resulting from the opening of pulsing springs S1 which occurs when the shaft 203 makes the first quarter of a complete revolution, relay 1+ is operated and locked to the relay 208, as described.

As the cam shaft 203 continues to rotate under the action of motor spring 202, the cams carried thereby move out of their first positions and advance to their second positions. The stud associated with the contact springs SO moves out of the notch 1 in cam P0 to cause the opening of the contact springs SO. Similarly the contacts S1 controlled by cam P1 are reclosed. With the opening of the contacts springs SO the signaling circuit to the source 209 is opened and relay 211 is deenergized. Relay 211 accordingly releases its armatures. In releasing its outer lower armature relay 211 removes the short circuit from the lower or secondary winding of relay 218 thereby permitting this relay to operate fully. At its three upper armatures relay 218 transfers the +, —, and ± leads from the first set of directional relays 1+ and 1—, to the second set of directional relays 2+, 2— and 2±. It will be noted at this time that the first set of directional relays consists of but two relays while the remaining two sets of directional relays each consists of three relays. This is due to the fact that the first component of each of the possible code signals is made up of either a positive or a negative current impulse and never includes both polarities. This is apparent from the chart shown in Fig. 9. The second and third components however may, as shown, in the chart, each consist of a positive impulse, a negative impulse, or a combination of both polarities and therefore require three directional relays for registering such impulses.

As the cam shaft 203 reaches its second position the stud associated with the springs SO drops into the notch 2 in cam P0 and simultaneously the pulsing lobe of cam P2 functions to separate the contact springs S2. The closure of the contacts SO reestablishes the continuity of the signaling loop and the contacts S2, in their operated condition remove the short circuit from the second pair of rectifiers $c$ and $d$. As neither of the contacts C and D has been operated by the code bar B1, the rectifiers $c$ and $d$ are still short-circuited on the transmitter side so that both half cycles from the source 209 will traverse the signaling path. Both relays 210 and 211 will therefore operate at this time. The circuit for relay 210 extends from the left terminal of the secondary winding of transformer 212, over the front contact and inner upper armature of relay 207, tip conductor of line L, alternate contacts of springs SON, closed cam contacts S1, conductor 222, contacts C and D, conductor 233, closed contacts S3 and SO, ring conductor of line L, inner lower armature and front contact of relay 207, rectifier 216, winding of relay 210, rectifier 215, to the right terminal of the secondary of transformer 212. The circuit for relay 211 may be traced from the right terminal of the secondary winding of transformer 212, rectifiers 213 and 214, winding of relay 211, front contact and inner lower armature of relay 207, ring conductor of line L, spring contacts SO and S3, conductor 233, contacts D and C, conductor 222, spring contacts S1, alternate contacts SON, tip conductor of line L, inner upper armature and front contact of relay 207, to the left terminal of the secondary of transformer 212.

Relay 210, at its inner upper armature and front contact, and relay 211, at its inner lower armature and front contact reconnect ground to the winding of slow-to-release relay 205 to insure this relay being held operated. With both relays 210 and 211 operated, a circuit may be traced from ground, outer upper armature and front contact of relay 211, front contact and outer lower armature of relay 210, innermost upper armature and back contact of relay 217, innermost upper armature and front contact of relay 218 (held operated to ground at the outer lower armature and front contact of relay 207), winding of relay 2±, conductor 226 to grounded battery 225. Relay 2± operates in this circuit and locks to ground on conductor 229 by way of its left armature and front contact.

At the outer upper armature and front contact of relay 210 and the outer lower armature and front contact of relay 211 a circuit is completed from ground, over the outer lower armature and back contact of relay 217, outer lower armature and front contact of relay 218, to battery and ground, through the upper, or primary winding of relay 217. Relay 217 partially operates in this circuit and at its inner lower armature and front contact connects its secondary, or lower winding in series with its upper winding to ground at the outer lower armature and front contact of relay 207. Relay 217 does not fully operate at this time because its secondary winding has ground potential applied to both terminals thereof. Thus, as a result of the transmission of the second component of the code signal relay 2± is operated and locked.

As the cam shaft 203 continues its rotation, the cams carried thereby move out of their second positions. As the cam PO moves out of the second position the stud associated with the contacts SO is moved out of notch 2 in cam PO causing the contacts SO to separate and open the signaling circuit. With the signaling circuit open, the relays 210 and 211 are deenergized and release their armatures. Thus, the short circuit is removed from the secondary winding of relay 217 allowing this relay to fully operate to ground at the outer lower armature and front contact of relay 207.

Relay 217, at its three upper armatures transfers the +, —, and ± leads from the second set of directional relays 2+, 2—, and 2±, to the third set of directional relays 3+, 3—, and 3±.

As the cam shaft 203 reaches its third position the stud associated with springs SO falls into notch 3 of cam PO causing the reclosure of springs SO and reestablishing the continuity of the signaling circuit. Simultaneously, the pulsing lobe of cam P3 operates springs S3 causing them to separate and to thereby remove the short circuit from the line side of rectifiers e and f. However, since neither contacts E nor F has been actuated by the code bar B1, these rectifiers are still short-circuited on their transmitter side. Neither half wave of the alternating current is therefore blocked and both half waves traverse the now closed signaling circuit to cause the reoperation of both relays 210 and 211. The circuit of relay 211 is traced from the right terminal of the secondary winding of transformer 212, rectifiers 213 and 214, winding of relay 211, front contact and inner lower armature of relay 207, ring conductor of line L, contact springs SO, conductor 234, contacts F and E, conductor 233, contact springs S2 and S1, alternate contacts SON, tip conductor of line L, inner upper armature and front contact of relay 207, to the left terminal of the secondary of transformer 212. The circuit for relay 210 extends from the left terminal of the secondary of transformer 212, over the front contact and inner upper armature of relay 207, thence over the tip conductor of line L, alternate contacts SON, contact springs S1 and S2, conductor 233, contacts E and F, conductor 234, contacts SO, to the ring conductors of the line, inner lower armature and front contact of relay 207, rectifier 216, winding of relay 210, rectifier 215, to the right terminal of the secondary winding of transformer 212.

With both relays 210 and 211 operated, directional relay 3± operates in a circuit traced from grounded battery 225, conductor 226, winding of relay 3±, front contact and innermost lower armature of relay 217, outer lower armature and front contact of relay 210, front contact and outer upper armature of relay 211 to ground. Relay 3± operated, locks to ground on conductor 229.

It will be noted at this time that when both half waves of signaling current are transmitted as the second and third components of a signal code, not only do directional relays 2± and 3± operate, but relays 2+, 2—, and 3+ and 3— will operate. However, it will be observed that when either relay 2+ or relay 3+ is operated the circuits to the armatures 2+, 2—, or 3+ and 3— are opened so that the operation of relays 2+ and 2— simultaneously with relay 2±, or the operation of relays 3+ and 3— simultaneously with relay 3± do not complete any line connecting circuits other than the one circuit controlled by either, or both relay 2± and relay 3±. In the case just described therefore, through relays 2+, 2—, 3+ and 3— operate, they do not function to effect a line circuit selection.

Relay 235 now partially operates in a circuit traced from grounded battery, upper or primary winding of relay 235, from contact and outer lower armature of relay 217, to ground by way of the outer upper armature and front contact and the outer lower armature and front contact of relays 210 and 211, respectively. In operating, relay 235 connects its lower, or secondary winding in series with its upper, or primary winding to ground at the outer lower armature and front contact of relay 207. Relay 235 is prevented from further operation as its secondary winding is short-circuited.

When shaft 203 moves out of the third position, the contact springs SO are again separated to open the signaling circuit. Relays 210 and 211 accordingly, are deenergized and release their armatures. Upon release of relays 210 and 211, the short circuit is removed from the secondary winding of relay 235 whereupon this relay fully operates under control of relay 207.

As a result of the transmission of the three components of the signal code which identifies the called station No. 2, directional relays 1+, 2± and 3±, are operated and locked to ground under control of relay 208. The signal code which identifies station No. 2 is made up of three components, a positive impulse and two impulses of both positive and negative polarities as indicated by the chart in Fig. 9. These components were selectively derived from the source 209 by the operation of code bar B1 incident to the actuation of the No. 2 key at the calling station. The three components were sequentially transmitted through the media of contact springs S1, S2 and S3 respectively controlled by cams P1, P2 and P3 carried by the shaft 203.

When the shaft 203 reaches its home position, the spring 236 engages the flat surface of cam 237 carried by the shaft 203. In its home position the notch in cam PON again receives the stud associated with the springs SON to further insure the shaft coming to rest in its home position and also to reconnect the calling substation to the line L and to remove the short circuit thereof which was maintained during the signaling interval by the alternate contacts SON. Thus, the signal transmitter and the calling station circuit are restored to normal condition, it being understood that when the shaft 203 reaches its home position the actuated code bar B1 is restored to normal position as previously described.

With directional relays 1+, 2± and 3± operated and locked under control of relay 208 the following circuit is established: from ground at the front contact and outer lower armature of relay 207, both armatures and front contacts of relay 235, winding of busy test relay 240, right armature and front contact of relay 1+, inner right armature and front contact of relay 2±, innermost right armature and front contact of relay 3±, conductor 230, upper 1-2 winding of relay 241, to battery and ground by way of conductors 290, 277 and resistance 291. Relay 241 if the called line is busy, does not operate in this circuit as will appear from the following description. It will be noted that battery for the energization of the connecting relay, such as relay 241 is associated with the line circuit of the called station, such as line circuit No. 2.

*Called station busy*

If the line extending to called station No. 2 is busy the connector relay 243 associated therewith will be operated. If operated, relay 243 at its outer upper armature and front contact connects ground potential to conductor 276 and thence, by way of resistance 304, to the conductor 277 which, as indicated in the preceding paragraph is connected to the left terminal of the 1-2 winding of relay 241 and to corresponding windings of similar relays associated with line No. 2 such as windings 3-2 and 4-2 of relays 332 and 348, by way of conductor 290. Thus, with ground potential connected to both sides of the winding 1-2 of relay 241, this relay will not operate.

The circuit previously traced as extending from the armatures of relay 235 through the winding of relay 240 also extends through resistance 345, thermistor 245, winding of relay 246, to battery and ground. Thus, if the called line is busy, relays 240 and 241 do not operate but, in about .3 second, the time required to heat thermistor 245 to a temperature which will permit sufficient current to traverse the winding of relay 246, relay 246 operates. At its middle upper armature, relay 246 connects a source of busy tone current BT to the calling line No. 1 over the ring conductor thereof.

Relay 246 is self-interrupting, that is, when it operates, it shunts the combination of thermistor 245 in series with the relay, with the resistance 247. The resulting current is sufficient to hold relay 246 operated but not enough to hold down the resistance of the thermistor 245. This resistance rises in about .25 second to a value that reduces the current through relay 246 to a value that allows the relay to release and disconnect the busy tone from the calling line. The relay again operates slowly through the thermistor but not quite as slowly as the original operate period due to the fact that the thermistor does not cool down to the ambient temperature. At the same time that relay 246 connected busy tone to the calling line, it connected ground at its outermost upper armature and front contact through the thermistor 248 to the lower winding of relay 228. After approximately four operations of relay 246, the resistance of thermistor 248 drops to the point at which sufficient current flows through the lower winding of relay 228, by way of conductor 305, to cause relay 228 to operate.

Relay 228 operated, extends the link L1 of line circuit No. 1 to battery and ground through the windings of line relay 249 which relay will operate when relay 207 releases to extend the link L1 to the line circuit L of the calling line as will now be described.

It will be recalled that slow-to-release relay 205 was held operated during the pulsing period under the control of relay 210 or relay 211 or under control of both, depending upon the code transmitted. When the code transmitting period is terminated relay 205 releases and opens the locking circuit to relay 207. Relay 207, released, connects the line L to link L1 so that line relay 249 is now connected across the established connection and will operate over the closed line loop at station No. 1.

It is to be noted at this time that the armature and contact arrangement of relay 207 is such that when relay 207 is released the continuity of the tip and ring conductors of line L and link L1 is reestablished before the outer lower armature of relay 207 removes ground potential from its front contact. Furthermore, relay 208 is slow to operate. Therefore when relay 249 operates it connects ground by way of its inner lower armature to the hold conductor 260 before the ground at the outer lower armature and front contact of relay 207 is removed from conductor 230. Thus, the relays which operated on the application of ground to conductor 230 are now held operated to ground under control of line relay 249.

At its outer lower armature and front contact relay 249 connects ground to conductor 558, then over the front contact and middle lower armature of relay 228, conductor 250, to battery and ground through the winding of relay 208. Relay 208 operates and at its outer lower armature and back contact opens the locking circuit for the operated directional relays, which relays then restore to normal.

When relay 207 released, as described, the locking circuit to relays 217, 218 and 235 is opened and these relays restore their armatures.

If desirable, the calling party may recall station No. 2 by again depressing the No. 2 button, followed by the depression of the reset button RE, to cause the code transmitter to again transmit the code corresponding to the called station No. 2. The circuit operations under this condition are the same as described hereinbefore in connection with the initiation of a call at station No. 1 and directed towards station No. 2. If, on a recall, the station No. 2 is still busy, relay 246 operates in the manner previously described.

Should the calling party abandon the call, line relay 249 releases when the handset at station No. 1 is restored to its mounting causing relay 228 to release. Relay 208 also releases when relay 249 restores its armatures.

*Completion of keyed call to station No. 2*

If the called line is idle there will be no direct ground connected to the left terminal of the 1–2 winding of relay 241 as previously indicated. Under this condition relays 240 and 241 will operate in a circuit extending from grounded battery associated with the line circuit No. 2, resistance 291, conductors 277 and 290, upper 1–2 winding of relay 241, conductor 230, front contact and innermost right armature of directional relay 3±, front contact and inner right armature of directional relay 2±, front contact and right armature of directional relay 1±, winding of relay 240, front contacts and armatures of relay 235, outer lower armature and front contact of relay 207 to ground. Relay 240 operates immediately in this circuit and at its upper armature and front contact connects resistance 255 in shunt with its own winding thereby increasing the flow of current in the circuit previously traced to a value sufficient to cause relay 241 to operate. At its lower armature and back contact, relay 240 opens the operating circuit of relay 246.

With relay 241 operated, ground on conductor 230 is extended over the upper double make contacts of relay 241 to conductor 260 and resistance 263 and thence in parallel to battery and ground through the upper winding of relay 262 and the lower winding of relay 228, the latter parallel branch including conductor 307. Relays 262 and 228 operate in these circuits.

The ground on conductor 230 is also extended over the upper double make contacts and outer upper armature of relay 241 to conductor 267 and thence over two parallel branches, one by way of conductor 273 and the upper winding of relay 243, and the other by way of conductor 261, the armature and back contact of relay 268 of line circuit No. 2, resistance 269, thermistor 270, winding of relay 271, to battery and ground. Relays 243 and 268 operate in these circuits.

As a consequence of the application of ground to the conductor 230, connecting relay 241, cut through relays 228 and 243, relay 262 of line circuit No. 1 and ringing relay 271 of line circuit No. 2 are operated and it will be described presently how these relays lock operated under control of line relay 249 of line circuit No. 1.

It has been described hereinbefore how, after the completion of the code transmitting period, relay 205 releases its armature to cause relay 207 to be deenergized. With relay 207 released, the calling line L is extended to the link L1, so that, with relay 228 operated, as described, line relay 249 operates over the closed line loop. Relay 208 operates, in the manner described hereinbefore, to release the operated directional relays, and relay 207 operated, releases relays 217, 218 and 235.

Relay 249 at its inner lower armature and front contact connects ground to conductor 307 to hold relay 228 operated. It also connects ground over resistance 263 and conductor 260, which ground, in effect, replaces the ground on conductor 230 so that relays 241, 243 and 271 are now held operated under control of relay 249 as is also relay 262.

Relay 228 at its outer upper armature and front contact connects ground potential to conductor 561, resistance 265, conductor 244 and thence in multiple to the right terminals of the lower windings of relays 241, 252 and 253 and of all similar relays by means of which the station No. 1 may be reached from all other stations of the system. In this manner the calling line is marked busy to all other lines of the system. Similarly, when relay 243 operates its outer upper armature, ground is extended over conductor 276, resistance 304, conductor 277, and thence in multiple to the right terminals of the lower windings of relays 332 and 348 and of all other similar relays by means of which the station No. 2 may be reached from all other stations of the system. Thus the busy condition of the called station No. 2 is made evident.

Relay 262 of line circuit No. 1, operated, opens the operating circuit to the ringing relay 264 to prevent ringing current being connected to the calling line.

Relay 241 at its inner upper and lower armatures and front contacts connects the tip and ring conductors 256 and 257 of line circuit No. 1 to corresponding conductors 556 and 557 of line circuit No. 2.

Relay 243 at its inner upper and innermost lower armatures and front contacts extends the tip and ring conductors 274 and 275 of line circuit No. 2 to corresponding conductors of the called line 2L of station No. 2 by way of corresponding conductors of link L2.

Relay 271 operates slowly, in the circuit previously traced, owing to the interval of time required by the thermistor 270 to heat sufficiently to allow adequate current to pass through the winding of relay. Relay 271 at its lower and outer upper armatures and front contacts connects the signaling current source 272 to the tip and ring conductors 274 and 275 towards the called station No. 2 and since relay 243 is operated and a relay, corresponding to relay 207 (Fig. 12) and associated with the line 2L of the called station is unoperated, this signaling current functions to operate the ringer at station No. 2 in the well-known manner. Relay 271 operates in the same manner as did relay 246 previously described so that it functions to apply signaling current to the called line intermittently and thus simulate machine ringing. By virtue of the combination of elements 270, 271 and 563, simulated machine ringing is derived from the alternating current source 272, and immediately upon the operation of the ringing relay the ringer at the called station is activated thus eliminating the delay in the ringer operation prevalent in systems using an interrupted ringing supply should the ringing relay operate on the silent interval.

*Party at called station No. 2 answers*

When the party at called station No. 2 responds to the operation of the ringer at station No. 2 and removes the handset from its support, line relay 280 of line circuit No. 2 operates, on the silent interval of the ringing cycle, over the closed loop at the called station. Relay 280, operated, causes relay 268 to operate in an obvious circuit. Relay 268 opens the operating circuit to relay 271 and locks in a circuit which may be traced from battery and ground, lower winding of relay 268, conductors 261 and 267, outer upper armature and front contact of relay 241, conductor 260, resistance 263, front contact and inner lower armature of relay 249 to ground. Relay 271, released, disconnects the ringing current source 272 from the called line and reconnects the windings of line relay 280 thereto.

It is to be understood that each time relay 271 releases its armatures during its intermittent operation, the windings of relay 280 are connected to the called line so that when the called party answers, relay 280 will operate as described. The resistance 281 and condenser 282 serve to preclude the transmission of objectionable clicks to the calling station when relay 280 is intermittently connected to and disconnected from the tip and ring conductors 274 and 275 incident to the intermittent operation of relay 271.

It will now be observed that cut-through relays 228 and 243 and connecting relay 241 are held operated under control of relay 280, it having been previously described how these relays are held operated also under control of relay 249. Relay 228 is held operated under control of relay 280 in a circuit extending from grounded battery, upper winding of relay 228, conductor 557, outer lower armature and front contact of relay 241, conductors 288 and 286, resistance 287, to ground at the front contact and inner lower armature of relay 280. The holding circuit for relay 243 extends from grounded battery, lower winding of relay 243, conductor 559, to ground at the front contact and inner lower armature of relay 280. The holding circuit for relay 241 extends from grounded battery in line circuit No. 1, resistance 242, conductor 244, lower 2–1 winding of relay 241, lower double make contacts and outer lower armature of relay 241, conductors 288 and 286, resistance 287, to ground at the front contact and inner lower armature of relay 280. In this last circuit it will be understood that relay 241, once operated, will hold operated on less current than is required to operate it. It is now apparent that the connection which is completed between stations Nos. 1 and 2 is held under the control of both called and calling parties and that both parties must restore their handsets in order to restore the circuits to normal.

With cut through relays 228 and 243 and connecting relay 241 operated, and ringing relays 264 and 271 released, the called and calling stations are interconnected by way of their corresponding line circuits No. 2 and No. 1 for communication purposes.

*Disconnection*

At the termination of conversation the telephone handsets at stations Nos. 1 and 2 are replaced on their respective supports and the consequent opening of the respective line circuits causes relays 249 and 280 to be deenergized. Relays 249 and 280 release their armatures and all relays which were held operated under their control are released and the circuit is restored to normal condition.

*Conference connection*

Any number of stations of the system may be interconnected for conference purposes. Heretofore, there has been described the completion of a connection between the stations No. 1 and No. 2 and for the purpose of describing the manner in which conference connections are completed it will be assumed that these two stations are still interconnected and that it is desirous that station No. 3 be added to the connection. It will be further assumed that the party at station No. 1 initiates the addition of station No. 3 though it is to be understood that either party to the established connection may undertake to add the additional station.

It will be recalled that the connection established between stations No. 1 and No. 2 is held under control of both line relays 249 and 280, these relays functioning independently to hold relays 228, 243 and 241 in their operated conditions. The addition of station No. 3 by the party at station No. 1 does not require the restoration of the handset at station No. 1 to its support on the telephone set. To effect the addition of the station No. 3 it is only necessary that the party at station No. 1 actuate the station-selecting button 3 and follow this operation by the actuation of the reset button RE. The actuation of button 3 at station No. 1 causes the operation of code bars A1 and D2 which function to prepare the code transmitter to transmit the code signal which identifies the No. 3 station. As shown in the chart of Fig. 9 the actuation of key or button 3 results in the transmission of a negative impulse, a positive impulse and an impulse of both positive and negative polarities.

The operation of the reset button RE subsequent to the operation of a station-selecting button while the handset is removed from its mounting performs the same function performed by the handset incident to its removal from its support in originating a regular station call.

When the reset button RE is actuated subsequent to the operation of button 3 at station No. 1 the cam shaft 203 is set in operation in the manner hereinbefore described. The line circuit L is opened at the contact springs SO due to the operation of cam PO which causes supervisory relay 204 to release its armatures and line relay 249 to be deenergized. The release of the inner lower armature of relay 249 performs no useful purpose at this time since relay 280 of line circuit No. 2 holds operated those relays which are held by the inner lower armature of relay 249. The outer lower armature of relay 249, however, removes ground from conductor 558 and therefore from conductor 250 which causes relay 208 to be deenergized. With relay 204 released and relay 205, due to its slow to release characteristic, still operated, relay 207 operates in a circuit which includes the armature and front contact of relay 205, the upper armature and back contact of relay 208, and ground at the armature and back contact of relay 204. Relay 207 operates and performs the same functions ascribed to it in a previous description. It is believed unnecessary to repeat the description of the code receiving and register circuit of Fig. 12 at this time. Suffice it to say that, in response to the sequential transmission of a negative impulse, a positive impulse, and an impulse of both positive and negative polarities, which code identifies station No. 3, directional relays 1−, 2+ and 3± operate and lock to ground at the outer lower armature and back contact of relay 208.

Assuming the line 3L of station No. 3 is idle, busy test relay 240 and connecting relay 252, in that order, will now operate in a circuit extending from grounded battery associated with line circuit No. 3, resistance 314, conductors 313 and 312, upper 1–3 winding of connecting relay 252, conductor 231, front contact and fifth right armature of relay 3±, front contact and outer right armature of relay 2+, front contact and right armature of relay 1+, winding of relay 240 and associated resistance 255 in parallel (assuming relay 240 to have operated), armatures and front contacts of relay 235, to ground at the outer lower armature and front contact of relay 207.

Relay 252 operated connects the tip and ring conductors 324 and 325 of line circuit No. 3 to corresponding conductors 256 and 257 of line circuit No. 1 by way of conductors 326 and 327 and the inner upper and lower armatures and front contacts of relay 252.

The ground on conductor 231 is extended over the upper double make contacts and outer upper armature of relay 252 to conductors 315 and 316, armature and back contact of relay 317 of line circuit No. 3, resistance 318, thermistor 319, winding of ringing relay 320, to battery and ground. A parallel branch of this circuit extends from conductor 316 over conductor 321 to battery and ground through the upper winding of cut through relay 322. Relays 320 and 322 accordingly operate to perform functions corresponding to those hereinbefore ascribed to relays 271 and 243 respectively.

Relay 320 causes ringing current from source 323 to be projected over conductors 328 and 329 towards the called station No. 3 and when the party thereat responds to the resulting operation of the ringing relay 335 of line circuit operates.

It will be understood that after the code signal has been transmitted slow-to-release relay 205 will restore its armature to effect the release of relay 207 which reestablishes the continuity of the tip and ring conductors of line L and link L1 so that line relay 249 of line circuit No. 1 will reoperate upon reclosure of the line loop at station No. 1. The reoperation of relay 249 causes relay 208 to operate and release the locked directional relays 1—, 2+ and 3±. Also when relay 207 restored its outer lower armature relays 217, 218, 253 and 240 are restored to normal.

When the party at station No. 3 responds to the incoming signal and thereby causes line relay 335 to operate, relay 317 of line circuit No. 3 operates over an obvious circuit to open the circuit to ringing relay 320. It will be noted now that cut-through relays 228, 243 and 323, and connecting relays 241 and 252 are held operated under control of all three line relays 249, 280 and 335 so that a party at any one of the three interconnected stations may initiate the addition of other stations to the connection without interfering with the established connection.

The conference connection described includes lines L, 2L and 3L and their respective links L1, L2 and L3 which, by the operation of cut-through relays 228, 243, and 322, are extended to the right ends (Fig. 14) of their corresponding line circuits Nos. 1, 2 and 3, the left ends of which are interconnected by the operation of connecting relays 241 and 252. Talking battery for each station is furnished from its own line circuit through the windings of the corresponding line relays 249, 280 and 335.

Disconnection

At the termination of conversation on the conference connection the parties at stations Nos. 1, 2 and 3 replace the handsets on their respective mountings and line relays 249, 280 and 335 are deenergized and release their armatures. All relays held locked by these line relays now release restoring the circuit to normal condition.

Holding on P. B. X line

If, during the time a connection between one of the stations of the system and the private branch exchange or central office is in progress, it becomes necessary for the party at the station to hold the connection while performing some other duty this may be accomplished in the following manner:

The hold button H at the station is actuated and then the reset button RE is operated. In response to the actuation of the hold key H at the station, station No. 3, for example, the code transmitter is conditioned to transmit a particular code signal, such as a code consisting of a negative impulse, followed by two impulses each of both positive and negative polarities (Fig. 9). The operation of the reset button causes the cam shaft 203 of the code transmitter at station No. 3 to be driven under the influence of motor spring 202 in a manner previously described so that the particular code corresponding to the actuated button H is transmitted over the line 3L. It will be understood that when the cam PO moves out of its home position SO are separated causing the supervisory relay similar to relay 204 to release its armature to complete an operating circuit for a relay corresponding to relay 207 in a manner previously described. The signal receiving and register circuit of line 3 function in response to the transmitted code to cause directional relays 1—, 2± and 3± to operate and lock under control of relay 208.

Ground at the front contact and outer lower armature of the relay such as relay 201 is then extended over the lower armatures and front contacts of relay 235, winding of relay 240, right armature and front contact of relay 1—, outer right armature and front contact of relay 2±, fourth right armature and front contact of relay 3±, conductor X extending from the register circuit of line No. 3, winding of relay 580 to battery and ground. Relay 580 operates in this circuit.

At its upper armature and front contact relay 580 establishes an obvious operating circuit for relay 322 which relay functions to open the connection towards the station No. 3. At contact 582, relay 580 opens the tip conductor towards the exchange to preclude the possibility of relay 600 operating in the hold circuit. At contacts 583, relay 580 connects the lowermost winding of relay 584 across the tip and ring conductors extending to the private branch exchange. Relay 584 thereupon operates and at its armature and front contact establishes a holding bridge across the private branch exchange line. This holding bridge extends from the ring conductor, over resistance 593, upper winding of relay 584, the armature and front contact of relay 584 to the tip conductor of the line. Thus the call on the private branch exchange line is held.

Relay 323 in operating extends the line of station No. 3 to its local line circuit No. 3 so that line relay 335 therein operates over the closed station loop. The operation of relay 335 causes the dismissal of the directional relays employed in establishing the hold connection. It will be observed now that the party at station No. 3 may call any other station in the system and talk to the party thereat while the exchange connection is being held. If desirable, the held connection may be picked up by a secretary, for example, whose station is indicated at Y in Fig. 13. In this case the secretary through suitable key equipment may connect her telephone to the extension of the private branch exchange line at her station and remove the handset from its mounting. Relay 660 under this condition operates, it being understood that relay 580 restores its armatures when its energizing circuit is opened incident to the dismissal of the register relays in the register circuit of line No. 3. Relay 580 operates from battery and ground at the exchange over contacts 582 of relay 580 (released) and the closed loop at the secretary's telephone. Relay 580 operated, shunts down relay 584 which releases and removes the holding bridge from the exchange line.

If the party at station No. 3 is to pick up the held connection, the switchhook or its equivalent at station No. 3 would be momentarily depressed so that relay 335 in line circuit No. 3 would restore its armatures and thereby open the holding circuit for relay 322 causing this relay to release and reconnect the line of station No. 3 to the private branch exchange line. Relay 600 would then operate in the manner previously described to remove the hold condition from the exchange line.

What is claimed is:

1. In combination in a telephone system in which station selecting signals initiated at a calling station are characterized by three consecutively transmitted code impulses, a line, a telephone station on said line having a telephone handset, key means at said station for predetermining the character of each of three code impulses, and means responsive to the removal of the handset at said station from its support subsequent to the actuation of said key means for consecutively applying the precharacterized code impulses to said line.

2. In combination in a telephone system in which station selecting signals initiated at a calling station consist of three consecutively transmitted code impulses, a line, a telephone on said line, separate means at said station for precharacterizing each of three code impulses, key means at said station for operating said separate means in various combinations, and means responsive to the removal of the handset of said telephone subsequent to the actuation of said key means for consecutively applying the three precharacterized code impulses to said line.

3. In combination in a telephone system in which station selecting signals initiated at a calling station are characterized by three consecutively transmitted code signals, a line, a telephone station on said line having a telephone handset, three pairs of dry rectifiers, individual means for short-circuiting each of said rectifiers on one side thereof, separate means for short-circuiting each pair of rectifiers on the other side thereof, key controlled means for operating said individual means in various combinations, and means responsive to the removal of the handset at said station subsequent to the operation of said key means for successively operating said separate means and for simultaneously connecting the corresponding pairs of rectifiers to said line.

4. In combination in a telephone system in which station selecting signals initiated at a calling station are characterized by a predetermined number of consecutively transmitted code signals, a line, a telephone station on said line having a telephone thereat, pairs of dry rectifiers corresponding in number to the predetermined number of code signals which characterize a station selecting signal, individual means normally short-circuiting each of said rectifiers on one side thereof, separate means normally short-circuiting each pair of rectifiers on the other side thereof, key means, means responsive to the operation of said key means for operating said individual means in various combinations to remove the individual short circuits from corresponding rectifiers, means for successively operating said separate means to remove the short circuits from said pairs of rectifiers successively, and means responsive to the removal of the handset of the telephone at said station for causing said successively operating means to operate and for connecting said line to said rectifiers simultaneously with each successive operation of said successively operating means.

5. In combination in a telephone system in which station selecting signals initiated at a calling station are characterized by a predetermined number of consecutively transmitted code impulses, a line, a telephone station thereon having a telephone, pairs of dry rectifiers corresponding in number to the predetermined number of code impulses which characterize a station selecting signal, first contact springs individual to each of said rectifiers normally maintaining each rectifier short-circuited on one side, second contact springs for each pair of rectifiers normally maintaining each pair of rectifiers short-circuited on the other side, key means, means controlled by said key means, when actuated, for operating said first contact springs in various combinations to remove the short circuits from corresponding individual rectifiers, a cam for each of said second contact springs, said cams being so relatively disposed on a common rotatable shaft that the cams function in sequence to successively operate their corresponding contact springs when said shaft is rotated, contacts for closing said line to said rectifiers, other camming means on the common shaft for closing said line closing contacts simultaneously with each successive operation of said second contact springs, means also controlled by said key means when actuated for preparing the common rotatable shaft for rotation, and means responsive to the removal of the handset of said telephone at said station for causing the common rotatable shaft to rotate and for connecting said line to said line closing contacts.

6. In combination in a telephone system in which station selecting signals initiated at a calling station are characterized by a predetermined number of consecutively transmitted code impulses, a line, a station on said line having a telephone set including a handset, and a code transmitter included in said telephone set and comprising key means operable to selectively precharacterize each of a predetermined number of code impulses, and means controlled jointly by said key means and the handset at said station when operated in a predetermined sequence for applying the precharacterized code impulses to said line consecutively.

7. The combination in a telephone system in which station selecting signals initiated at a calling station are characterized by a predetermined number of code impulses and in which each impulse is tranmitted over a line during a different interval of a code transmitting period, of a line, a station on said line having a telephone set, and a code transmitter comprising pairs of rectifiers corresponding in number to the number of code impulses and normally excluded from said line, contact means for each rectifier effective, when operated, to render the corresponding rectifier available for inclusion in said line, key means for operating said contact means in various combinations whereby corresponding rectifiers of said pairs of rectifiers are simultaneously rendered available for inclusion in said line, other contact means normally excluding each pair of rectifiers from said line, a cam shaft, a cam for each of said other contact means carried by said shaft, said cams being so relatively disposed that they operate their corresponding contact springs sequentially, cam controlled means for closing said line to said other contact means once during each code transmitting interval and simultaneously with each operation of said other contact means, and means responsive to the removal of the handset at said station subsequent to the actuation of said key means for closing said line to all said contacts and for causing said cam shaft to operate, whereupon said line is closed to a different pair of rectifiers once for each code transmitting interval and a code signal consisting of the predetermined number of code impulses is transmitted over the line and each code impulse is characterized in accordance with the combination of contact means operated by said key means.

8. In combination in a telephone system, a telephone station having a telephone set thereat, a line individual to said station, a code transmitter associated with said telephone set, a plurality of keys each individually operable to precondition said code transmitter for the transmission thereby of distinctive code signals, operating means for said code transmitter which functions to cause said transmitter to operate subsequent to its preconditioning by said keys, means at said station for connecting said code transmitter to said line circuit and for simultaneously causing said code transmitter operating means to function, whereby the resulting operation of said code transmitter causes the transmission over said line of a code signal in accordance with the preconditioning of said code transmitter, and other means at said station for causing said code transmitter operating means to function without connecting said code transmitter to said line.

9. In combination in a telephone system, a telephone station having a telephone set thereat, a line individual to said station, a code transmitter associated with said telephone set including a plurality of station selecting keys, means responsive to the actuation of any of said keys for preconditioning said code transmitter to transmit a code signal individually characteristic of the actuated key, duplicate means for causing said code transmitter to operate subsequent to the actuation of any of said station selecting keys, one of said duplicate means including the handset of the telephone set at said station, and means controlled only by said handset for connecting said code transmitter to said line.

LANGFORD J. BOWNE.

REFERENCES CITED

The following references are of record in the file of this patent:

UNITED STATES PATENTS

| Number | Name | Date |
|---|---|---|
| 2,314,801 | Roberts | Mar. 23, 1943 |
| 2,134,626 | Shipton | Oct. 25, 1938 |
| 1,633,116 | Lomax | June 21, 1927 |
| 2,321,758 | Logan | June 15, 1943 |